US008662767B2

(12) United States Patent
Honjo et al.

(10) Patent No.: US 8,662,767 B2
(45) Date of Patent: Mar. 4, 2014

(54) CAMERA BODY AND IMAGING DEVICE

(75) Inventors: Kenichi Honjo, Osaka (JP); Hiroshi Ueda, Osaka (JP); Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 12/987,263

(22) Filed: Jan. 10, 2011

(65) Prior Publication Data

US 2011/0103789 A1 May 5, 2011

Related U.S. Application Data

(63) Continuation of application No. PCT/JP2009/004155, filed on Aug. 27, 2009.

(30) Foreign Application Priority Data

Sep. 11, 2008 (JP) ................................. 2008-233404

(51) Int. Cl.
*G03B 17/00* (2006.01)
(52) U.S. Cl.
USPC .......................................................... 396/530
(58) Field of Classification Search
USPC ..................... 396/71, 530; 359/506
See application file for complete search history.

(56) References Cited

U.S. PATENT DOCUMENTS

| 5,382,994 | A | * | 1/1995 | Naito et al. ................. 396/530 |
| 5,734,935 | A | * | 3/1998 | Imanari et al. .............. 396/71 |
| 7,742,693 | B2 | * | 6/2010 | Kobayashi ..................... 396/91 |
| 2007/0047953 | A1 | | 3/2007 | Kawai |
| 2010/0091175 | A1 | | 4/2010 | Shintani et al. |

FOREIGN PATENT DOCUMENTS

| JP | 4-273226 | 9/1992 |
| JP | 2000-75197 | 3/2000 |
| JP | 2001-125173 | 5/2001 |
| JP | 2006-343510 | 12/2006 |
| JP | 2007-58123 | 3/2007 |
| JP | 2008118199 A * | 5/2008 ............. H04N 5/232 |
| WO | 2008/099605 | 8/2008 |

OTHER PUBLICATIONS

International Search Report of PCT Application No. PCT/JP2009/004155 dated Dec. 8, 2009.

* cited by examiner

*Primary Examiner* — Clayton E Laballe
*Assistant Examiner* — Noam Reisner
(74) *Attorney, Agent, or Firm* — Panasonic Patent Center

(57) ABSTRACT

A camera body includes a housing, an imaging element and a body mount. The body mount is fixed to the housing, and has a portion to which an adapter can be mounted. The body mount is disposed at a position away from the light receiving face of the imaging element by the amount of a flange back. A lens back of an interchangeable lens unit is longer than the flange back. The flange back is shorter than the length obtained by subtracting the adapter length, which is the length of the adapter in the optical axis direction, from the lens back.

12 Claims, 27 Drawing Sheets

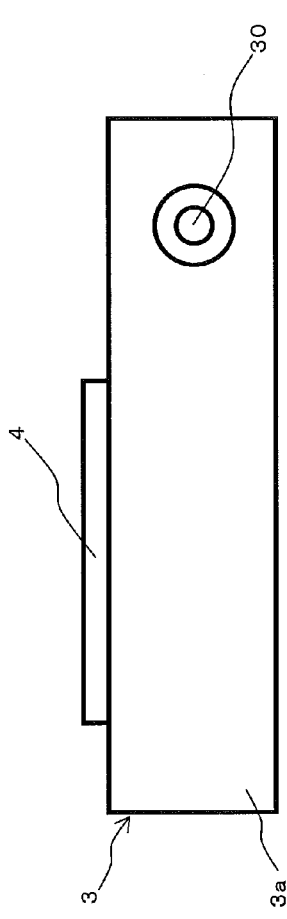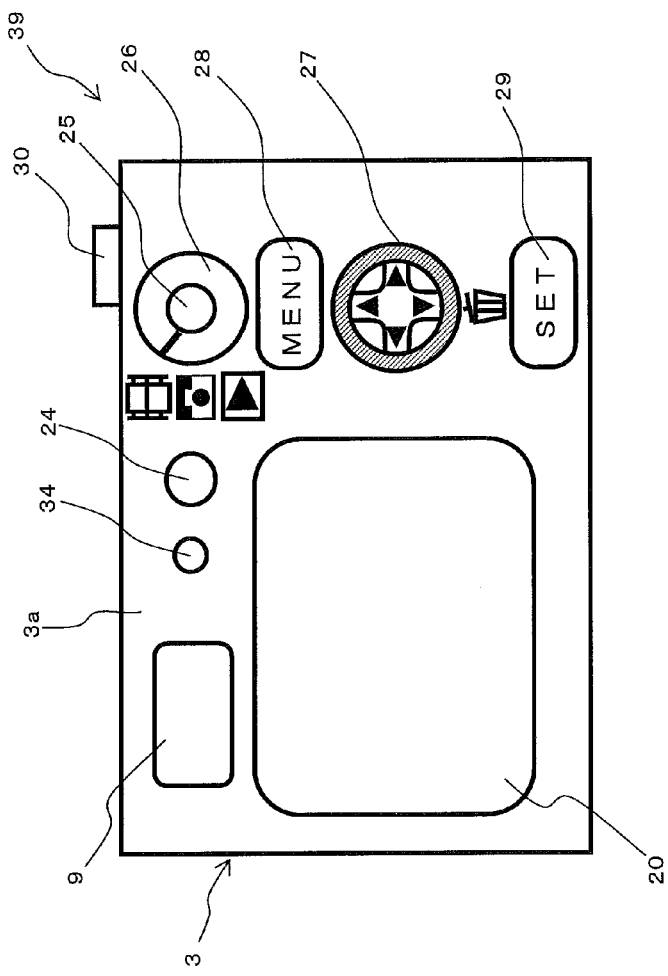
FIG. 4A
FIG. 4B

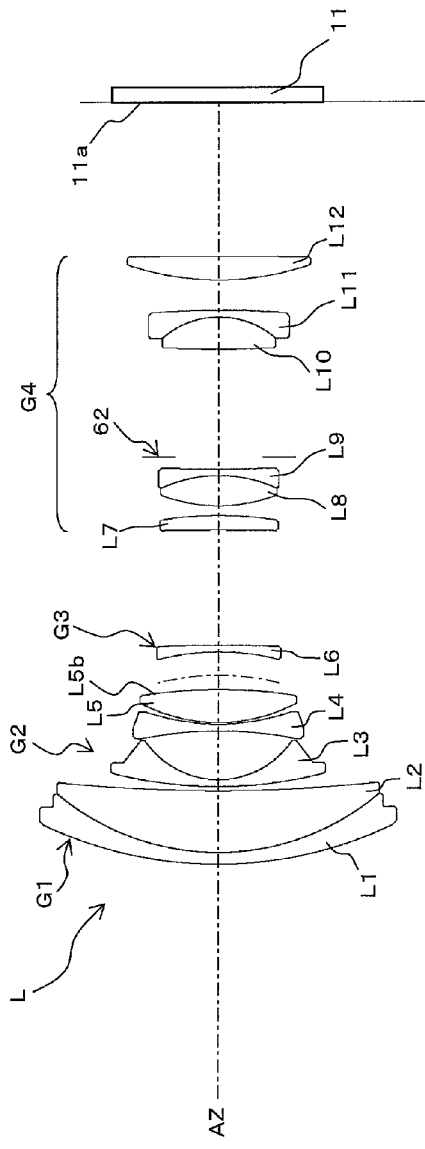
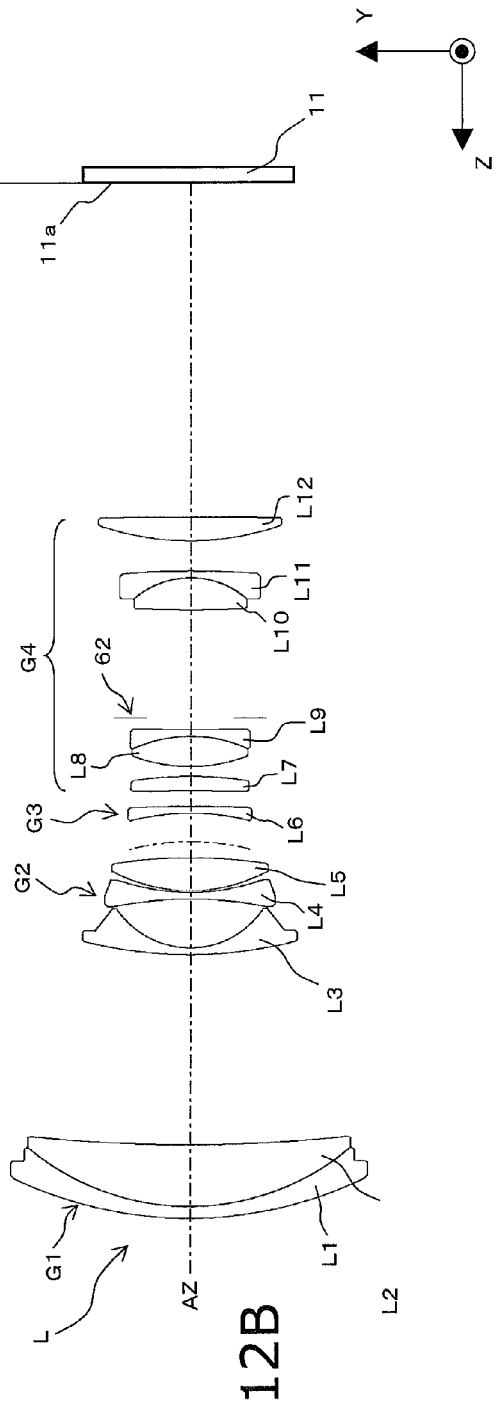
FIG. 12A
FIG. 12B

CAMERA BODY AND IMAGING DEVICE

CROSS-REFERENCE TO RELATED APPLICATIONS

This application is a continuation of International Patent Application No. PCT/JP2009/004155 filed on Aug. 27, 2009. The entire disclosure of International Patent Application No. PCT/JP2009/004155 is hereby incorporated herein by reference.

This application claims priority to Japanese Patent Applications No. 2008-233404 filed on Sep. 11, 2008. The entire disclosure of Japanese Patent Applications No. 2008-233404 is hereby incorporated herein by reference.

BACKGROUND

1. Technical Field

The technology disclosed herein relates to a camera body used in an interchangeable lens type of imaging device.

2. Background Information

Digital cameras and other such imaging devices have rapidly grown in popularity in recent years. A digital single lens reflex camera is a known type of digital camera. With a digital single lens reflex camera, when a subject is viewed through an optical viewfinder, light incident on the optical system (that is, the subject image) is reflected by a quick return mirror disposed along the optical path, and is guided to the viewfinder optical system. As a result, the subject image is converted into an erect image via a pentaprism or the like, and is guided to the optical viewfinder. Consequently, the user can view the subject image formed by the optical system through the optical viewfinder.

Meanwhile, when the optical system is used for imaging, the quick return mirror is retracted from the imaging optical path. As a result, the viewfinder optical path is switched to the imaging optical path, and when imaging is finished the quick return mirror returns instantly to its home position. This method is the same for both conventional silver halide cameras and digital cameras, as long as they are single lens reflex types.

However, imaging with an optical viewfinder can be extremely difficult for a novice who is inexperienced with the use of digital cameras.

In view of this, there has been a proposal for an imaging device having a monitor imaging mode (a so-called live view imaging mode) with which the subject can be viewed on a liquid crystal monitor during imaging (see Japanese Laid-Open Patent Application 2001-125173, for example).

SUMMARY

Since a conventional digital single lens reflex camera has a quick return mirror, the flange back of the camera body to which the interchangeable lens unit is mounted is longer. A longer flange back results in a larger interchangeable lens unit in which the optical system is installed, so it is difficult to reduce the size of a conventional digital single lens reflex camera.

In view of this, digital cameras that do not have a quick return mirror have been studied. With these digital cameras, since there is no need to leave space for a quick return mirror, the flange back of the camera body can be shorter, and as a result the camera body can be made more compact.

However, if the flange back of the camera body is shortened, compatibility cannot be ensured with interchangeable lens units corresponding to conventional camera bodies that have a quick return mirror and a longer flange back. That is, with a camera body having a shortened flange back, there may be situations in which an interchangeable lens unit purchased in the past cannot be used.

The use of an adapter is one way to ensure compatibility between interchangeable lens units and camera bodies.

However, when the auto focus method used by the camera body is contrast detection, for example, the focus lens has to be moved extra distance in the optical axis direction in order to detect the maximum AF evaluation value. Past interchangeable lens units did not anticipate compatibility with contrast detection systems, and there is often not enough extra room in the movable range of the focus lens. Therefore, even if the operation of the focus lens is controlled by contrast detection method, depending on the interchangeable lens unit that is mounted, there may be a region in which the focus lens is mechanically unable to move, and as a result there is the risk that auto focus cannot be performed.

Thus, when a camera body is made more compact, there is the risk that it cannot be used with an interchangeable lens unit purchased in the past.

With the teachings disclosed herein, a camera body and an imaging device can be provided with which the size can be reduced while still ensuring compatibility with more interchangeable lens units.

Furthermore, with the teachings disclosed herein, an adapter can be provided with which the size of the camera body can be reduced while still ensuring compatibility between the camera body and more interchangeable lens units.

A camera body disclosed herein allows an interchangeable lens unit to be mounted via an adapter. This camera body includes a housing, an imaging element and a body mount. The imaging element is held in the housing, and acquires an image signal of a subject. The body mount is fixed to the housing, and has a portion to which an adapter can be mounted. The body mount is disposed at a position away from the light receiving face of the imaging element by the amount of a flange back. A lens back of the interchangeable lens unit is longer than the flange back. The flange back is shorter than the length obtained by subtracting the adapter length, which is the length of the adapter in the optical axis direction, from the lens back.

With this camera body, since the flange back is shorter than the lens back of the interchangeable lens unit, the size can be smaller than with a camera body that conforms to the same standard as this interchangeable lens unit.

Furthermore, the flange back is shorter than a length obtained by subtracting the adapter length from the lens back. In other words, the adapter length is shorter than a reference length obtained by subtracting the flange back from the lens back. Accordingly, when an interchangeable lens unit is mounted to the camera body via the adapter, the interchangeable lens unit can be disposed closer to the camera body. Consequently, extra room for contrast detection can be ensured in the movable range of the focus lens of the interchangeable lens unit, for example. That is, even with an interchangeable lens unit that does not have extra room, a contrast detection method can still be used.

Because of the above, with this camera body and an imaging device comprising this camera body, the size can be reduced while still ensuring compatibility with more interchangeable lens units.

An adapter disclosed herein is able to connect an interchangeable lens unit having a lens back and a camera body having a flange back. This adapter includes a first mounting portion and a second mounting portion. The first mounting portion is configured to be mounted to the camera body. The second mounting portion is configured to be mounted to the interchangeable lens unit, and is disposed at a position away from the first mounting portion by the adapter length. The flange back is shorter than the lens back. The adapter length is shorter than a reference length obtained by subtracting the flange back from the lens back.

With this adapter, the adapter length is shorter than a reference length obtained by subtracting the flange back from the lens back. Accordingly, when an interchangeable lens unit is mounted to the camera body via the adapter, the position of the interchangeable lens unit is shifted to be closer to the camera body in the optical axis direction. Consequently, extra room for contrast detection can be ensured in the movable range of the focus lens unit of the interchangeable lens unit, for example. That is, even with an interchangeable lens unit that does not have extra room, a contrast detection method can still be used.

Because of the above, with this adapter, the size of the camera body can be reduced while still ensuring compatibility with more camera bodies and interchangeable lens units.

Also, another camera body disclosed herein allows an external unit to be mounted. This camera body includes a body mount attachable to an external unit, and a corrector configured to correct position information about the focus lens included in the external unit according to the external unit mounted to the body mount.

With this camera body, when the external unit is mounted to the body mount, the position information of the focus lens is corrected by the corrector according to the external unit. Therefore, even if an external unit of a different standard from that of the camera body is mounted, the position information of the focus lens can still be made to correspond to the camera body, and compatibility can be ensured with more camera bodies and interchangeable lens units.

BRIEF DESCRIPTION OF THE DRAWINGS

Referring now to the attached drawings which form a part of this original disclosure:

FIG. 4A is a top view of a camera body, and FIG. 4B is a rear view of a camera body;

FIG. 12A is a diagram of the configuration of an optical system (wide angle end), and FIG. 12B is a diagram of the configuration of an optical system (telephoto end);

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Overview of Digital Camera

Figure 1:
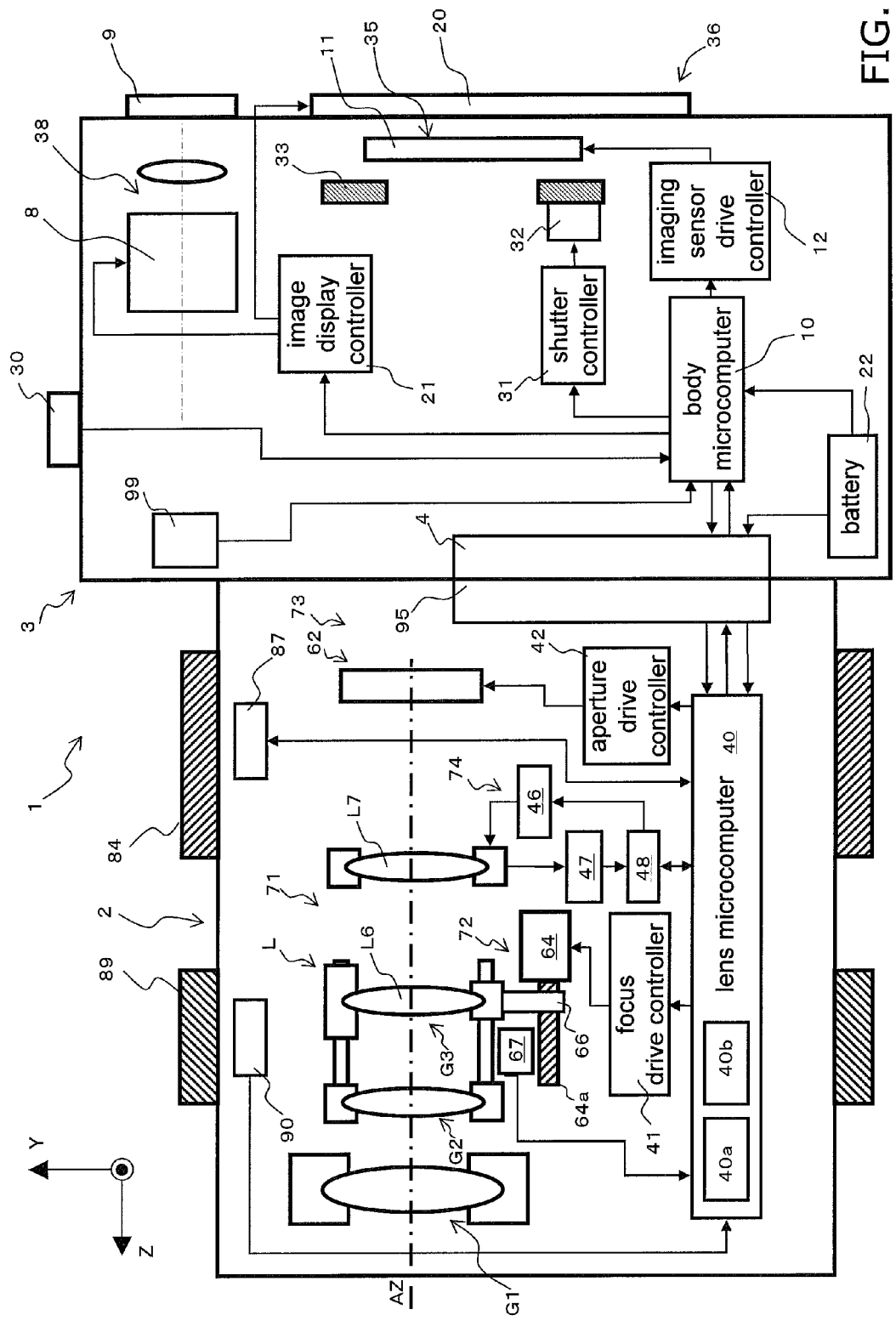
FIG. 1 is a simplified diagram of the configuration of a digital camera.

A digital camera 1 will be described through reference to FIGS. 1 to 13. FIG. 1 is a simplified diagram of the configuration of the digital camera 1. As shown in FIG. 1, the digital camera 1 (an example of an imaging device) is a digital camera with an interchangeable lens, and mainly comprises a camera body 3 and an interchangeable lens unit 2 that is removably mounted to the camera body 3. The interchangeable lens unit 2 is mounted via a lens mount 95 to a body mount 4 provided to the front face of the camera body 3. The camera body 3 and the interchangeable lens unit 2 conform to the same standard.

The "standard" here is a convention that allows an interchangeable lens unit to be mounted and used with a camera body. In this standard, first of all the shapes of the components are determined so that the body mount can be mounted to the lens mount. Further, the standard dictates the distance from a reference face of the body mount to the imaging face (also called the light receiving face), that is, the flange back.

The interchangeable lens unit is designed so that the rear focal point is located on the imaging face in a state in which the lens mount has been mounted to the body mount. The distance from the reference face to the rear focal position in the optical axis direction when the lens mount has been mounted to the body mount is also called the lens back. With a camera body and an interchangeable lens unit that are compatible, the lens back is the same length as the flange back. Therefore, the lens back is a value unique to the interchangeable lens unit, and could also be called the flange back of a camera body having a body mount to which a lens mount having the interchangeable lens unit can be mounted. The standard further dictates the signals exchanged by the camera body and the interchangeable lens unit, and so forth.

Figure 2:
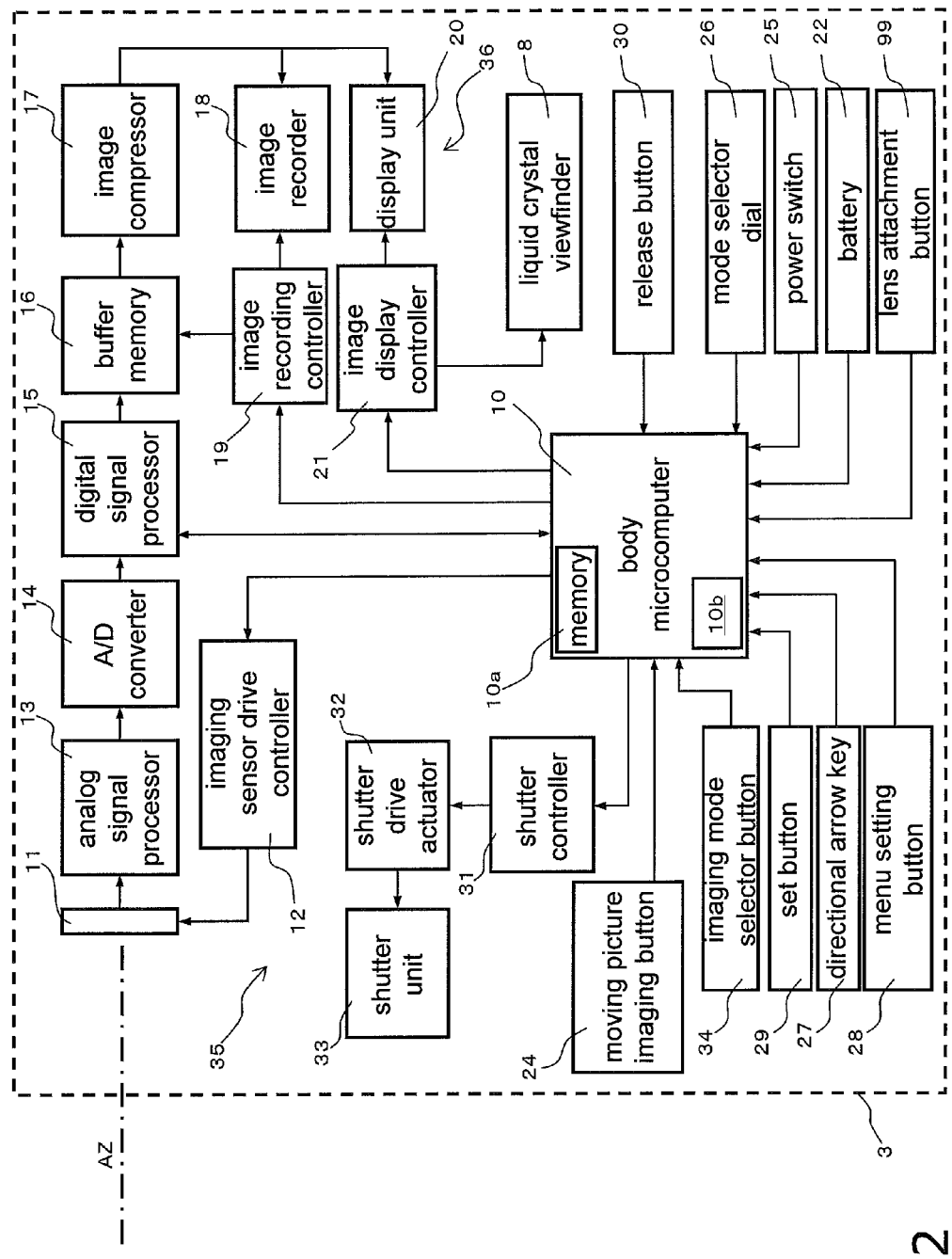
FIG. 2 is a block diagram of the configuration of a camera body.
Figure 3:
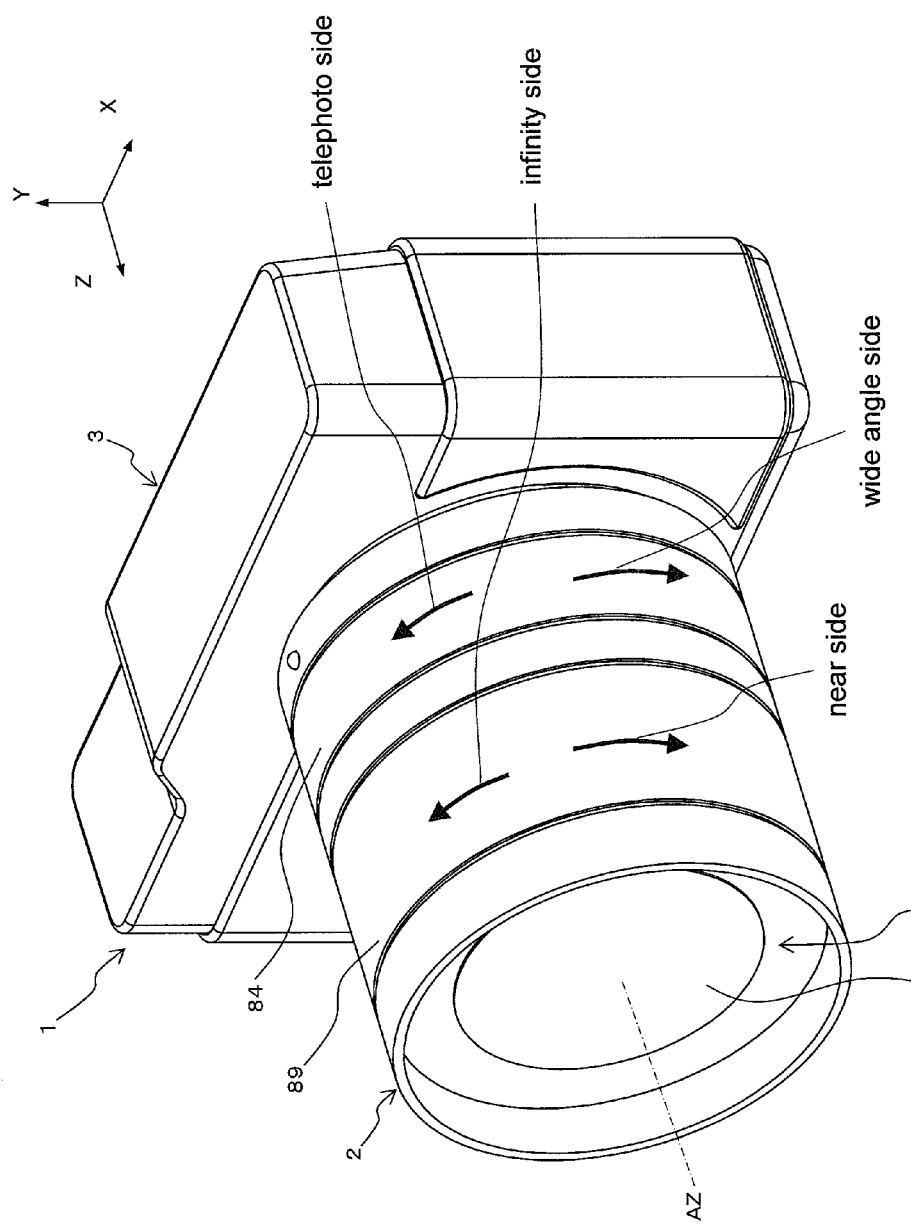
FIG. 3 is a simplified oblique view of a digital camera.
Figure 5:
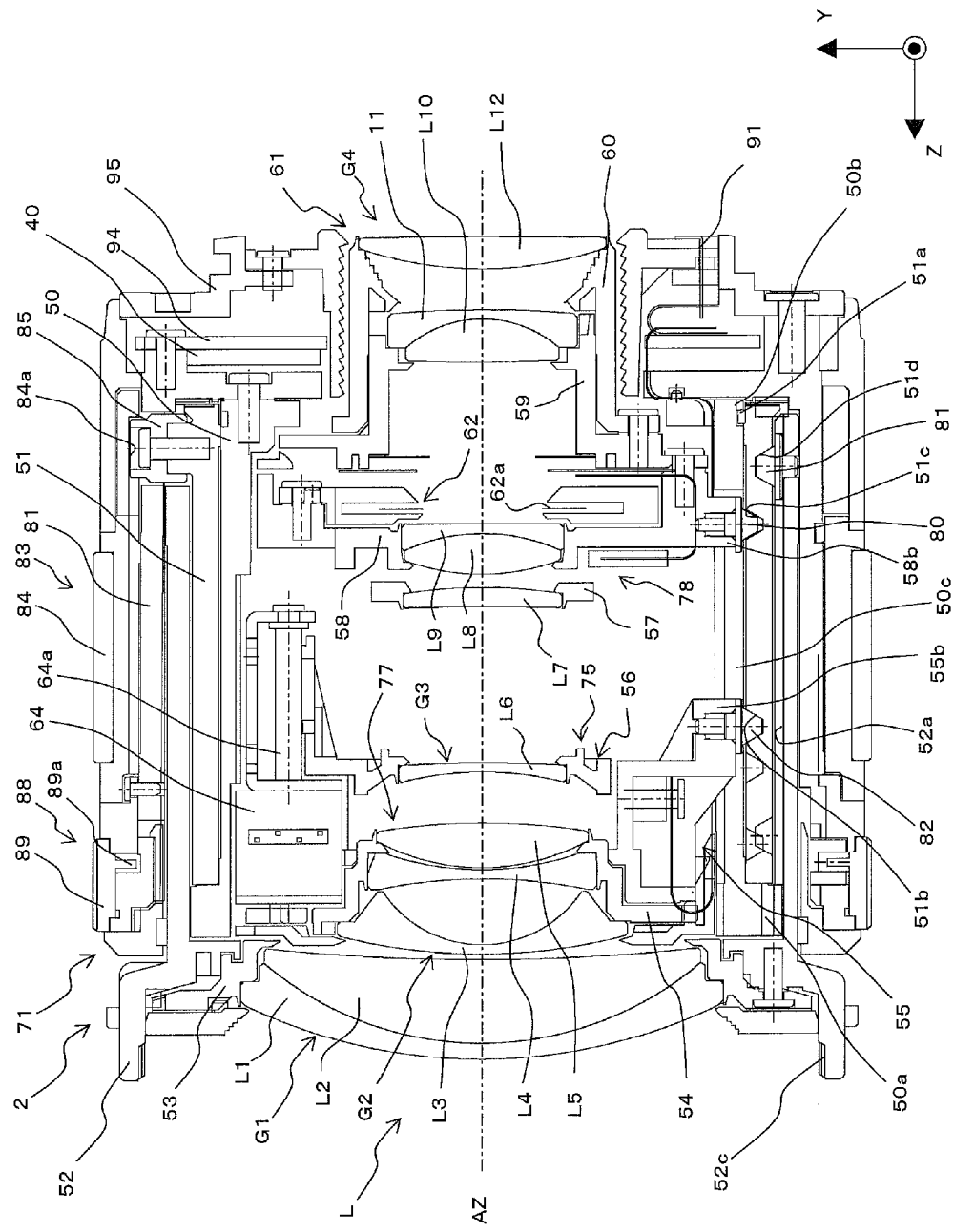
FIG. 5 is a cross section of an interchangeable lens unit (wide angle end)
Figure 6:
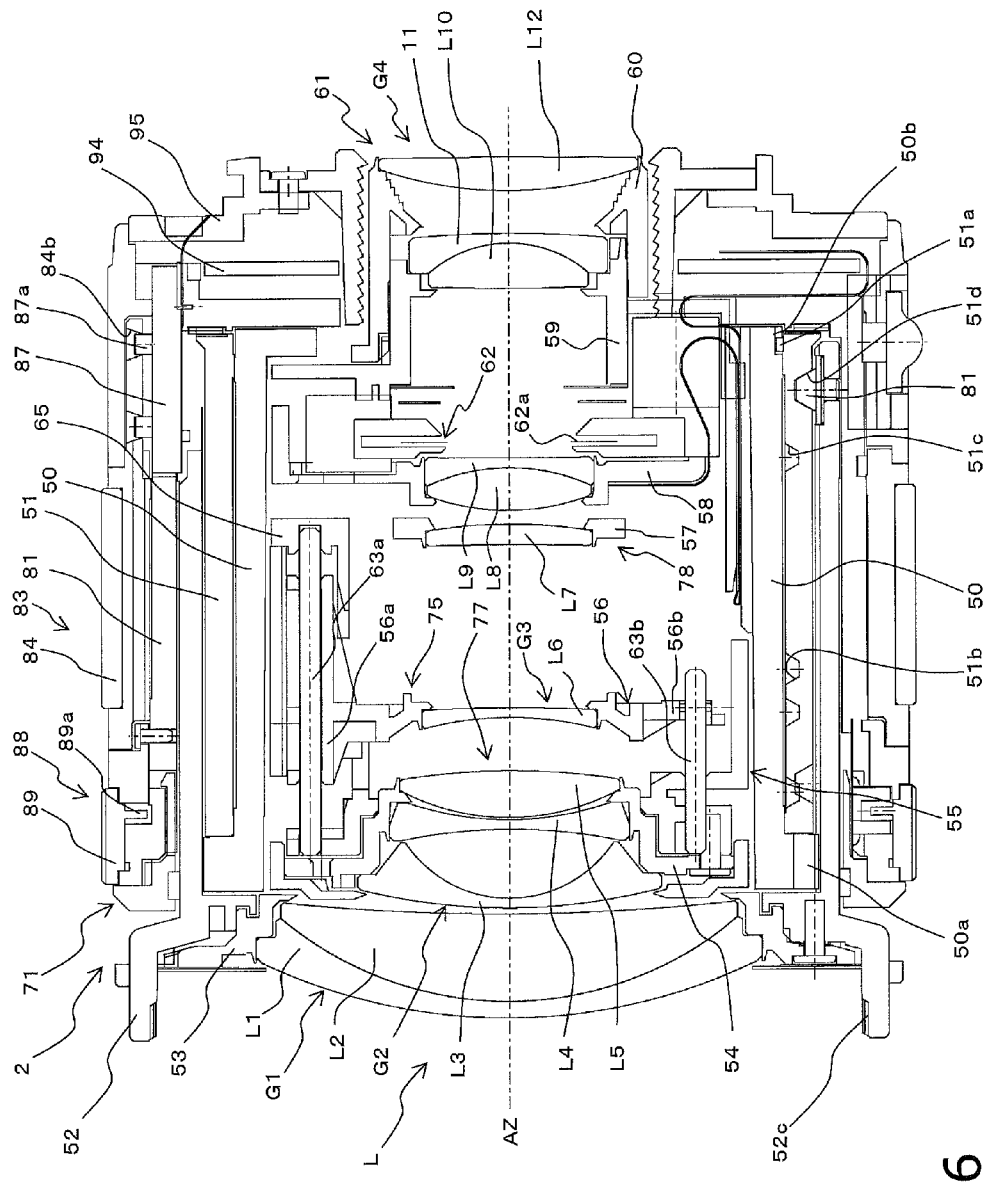
FIG. 6 is a cross section of an interchangeable lens unit (wide angle end)
Figure 7:
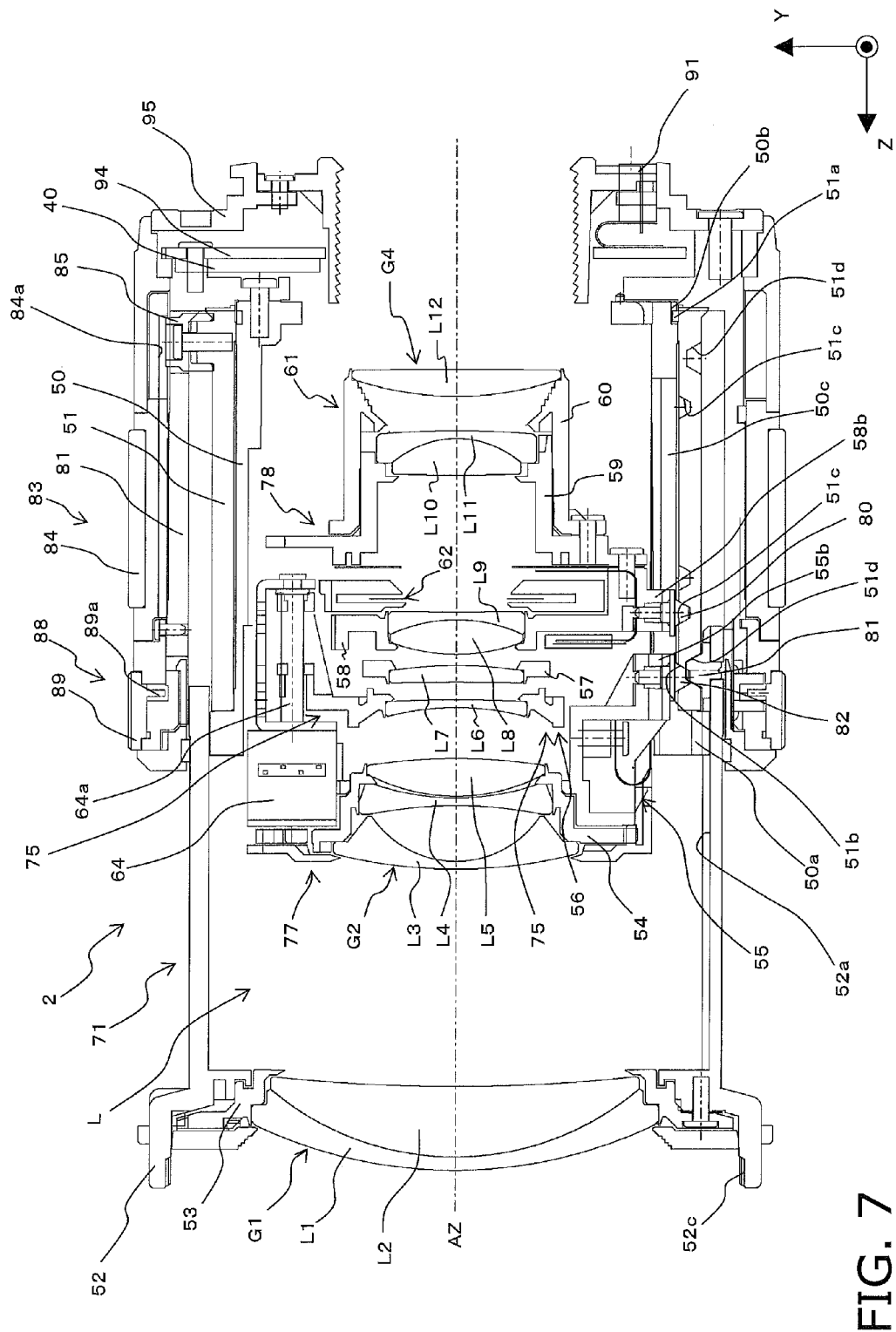
FIG. 7 is a cross section of an interchangeable lens unit (telephoto end)
Figure 8:
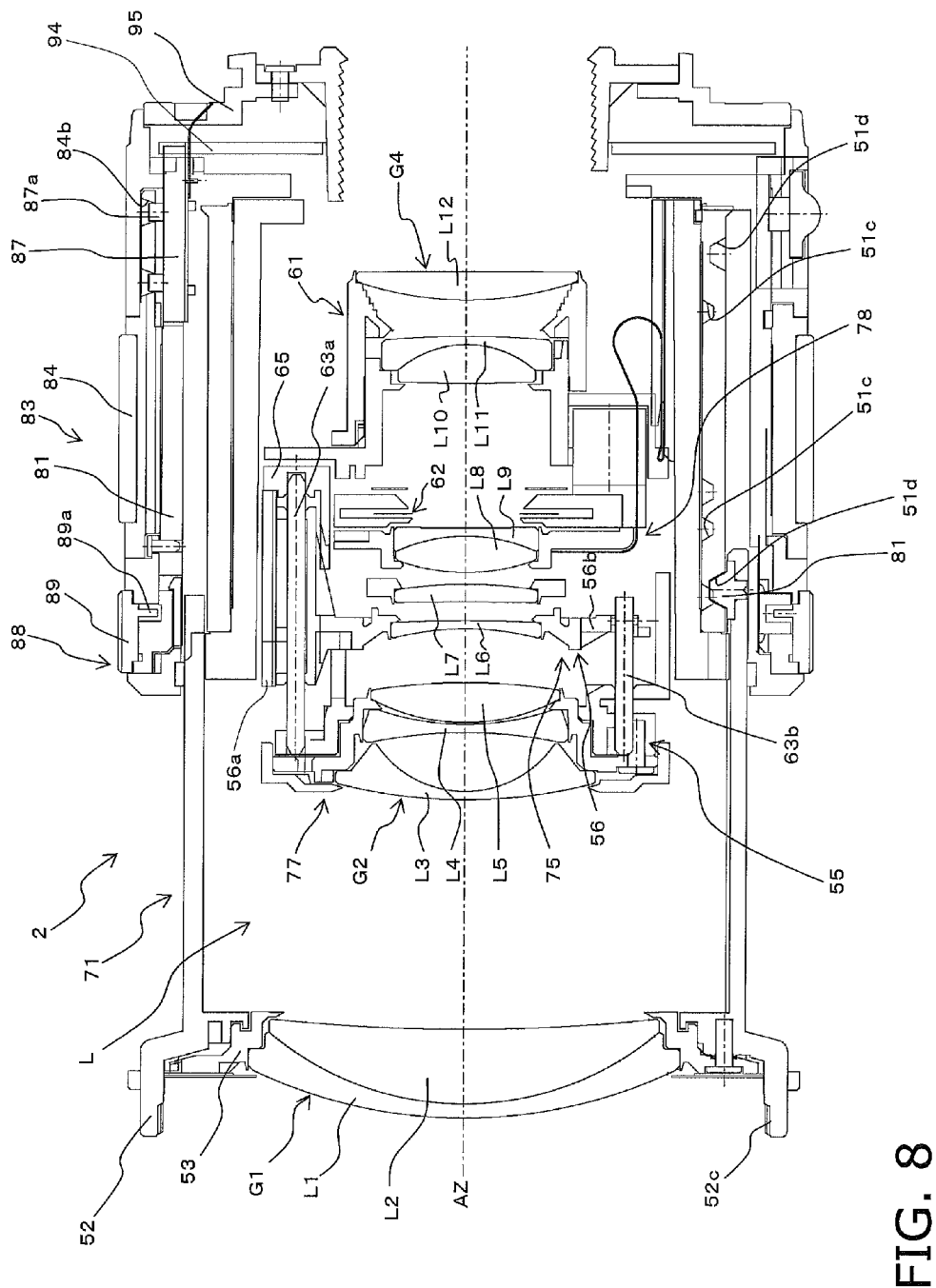
FIG. 8 is a cross section of an interchangeable lens unit (telephoto end)
Figure 9:
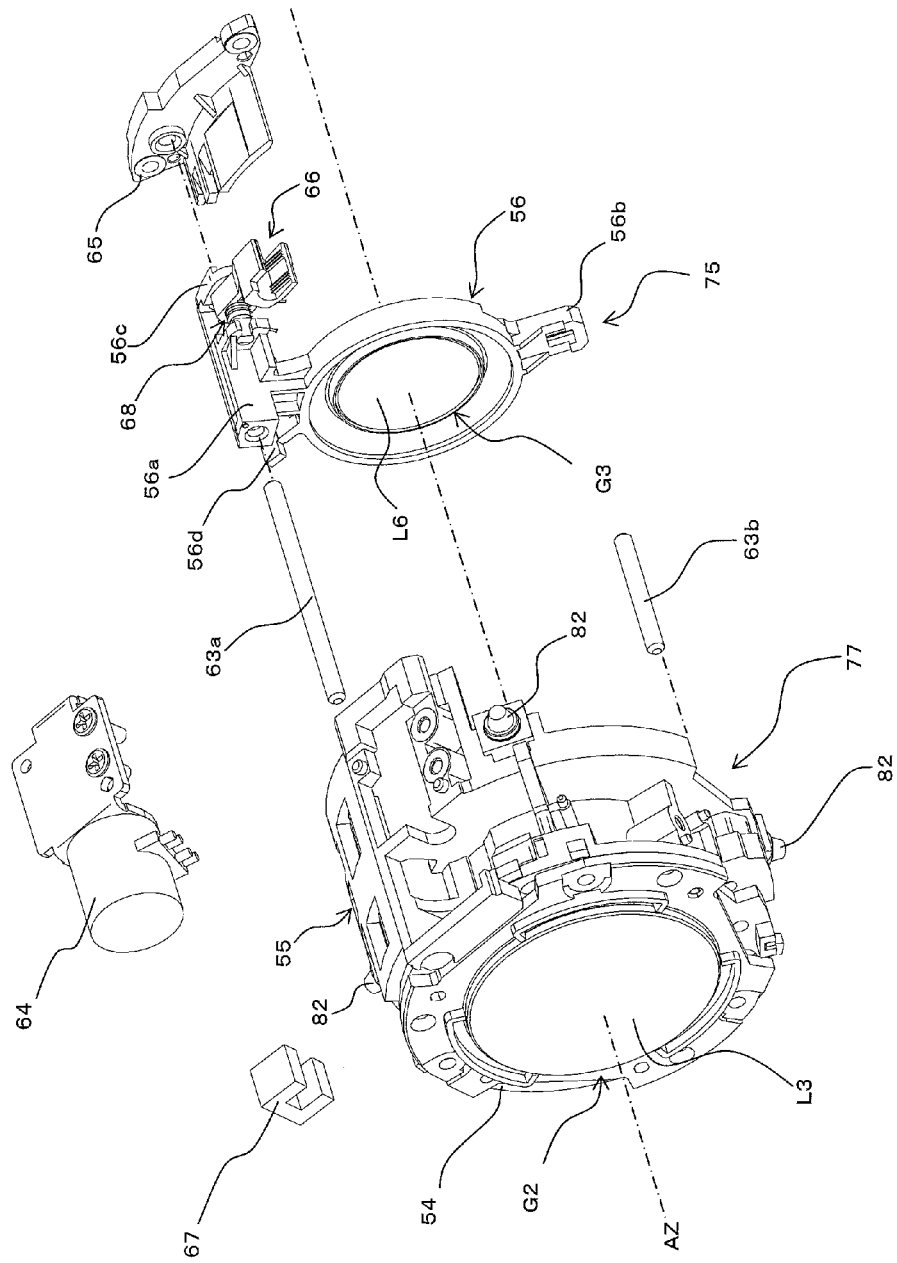
FIG. 9 is an exploded oblique view of a second lens group unit and a focus lens unit.
Figure 10:
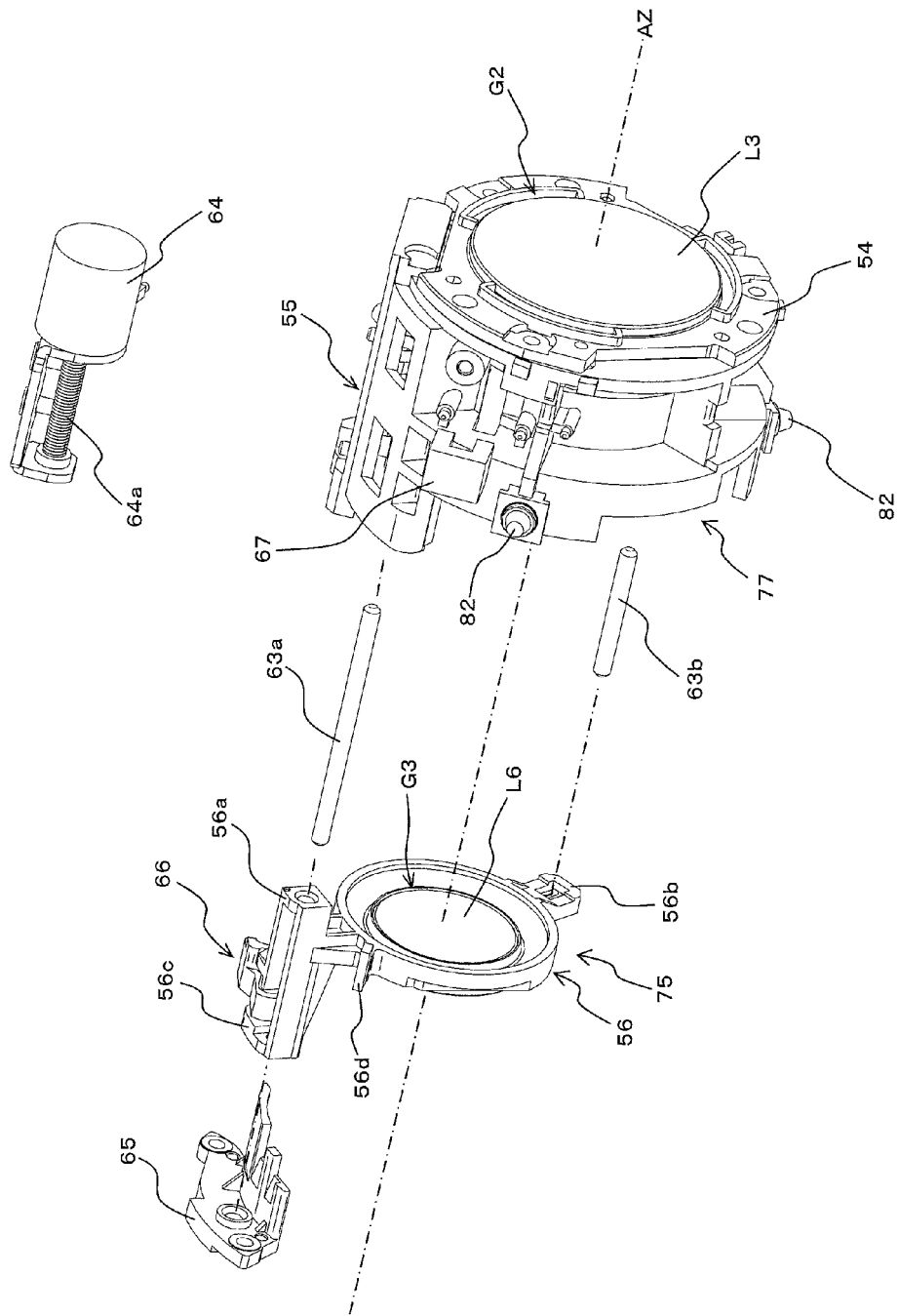
FIG. 10 is an exploded oblique view of a second lens group unit and a focus lens unit.
Figure 13:
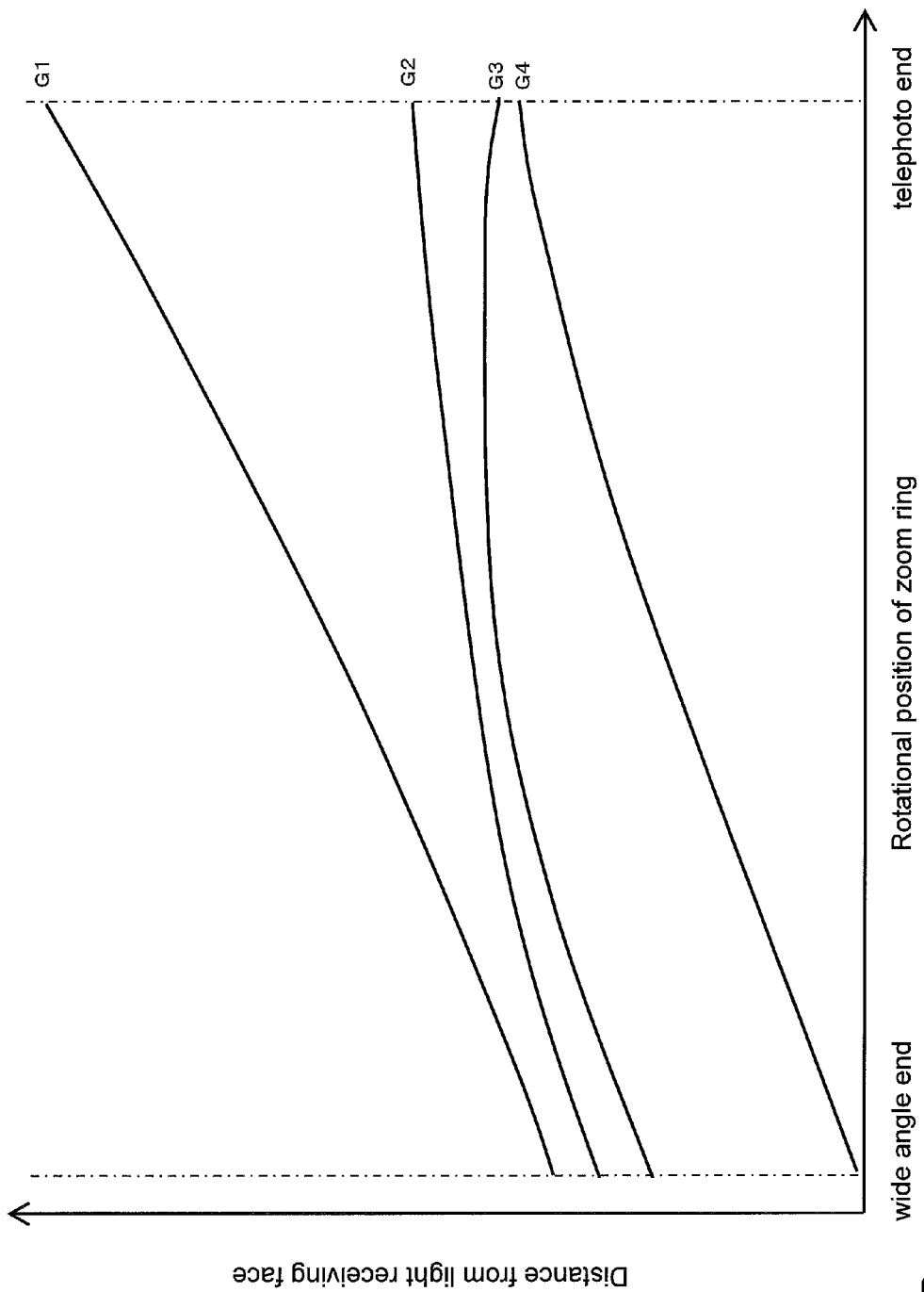
FIG. 13 is a graph of the relation between the rotational angle of a zoom ring and the distance of various members from an imaging sensor.

FIG. 2 is a block diagram of the configuration of the camera body 3. FIG. 3 is a simplified oblique view of the digital camera 3. FIG. 4A is a top view of the digital camera 3, and FIG. 4B is a rear view of the digital camera 3. FIGS. 5 to 8 are simplified cross sections of the interchangeable lens unit 2. FIGS. 5 and 6 show the state at the wide angle end, while FIGS. 7 and 8 show the state at the telephoto end. FIG. 6 is a cross section in a different plane from that of FIG. 5. FIG. 8 is a cross section in a different plane from that of FIG. 7. FIGS. 9 and 10 are exploded oblique views of a second lens group unit 77 and a focus lens unit 75. FIGS. 12A and 12B are diagrams of the configuration of an optical system L. FIG. 12A shows the state at the wide angle end, while FIG. 12B shows the state at the telephoto end. FIG. 13 shows the relation between the rotational position of a zoom ring 84 and the distance of various members from an imaging sensor 11.

In this embodiment, a three-dimensionally perpendicular coordinate system is set with respect to the digital camera 1. The optical axis AZ of the optical system L (discussed below) coincides with the Z axis direction (an example of the optical axis direction). The X axis direction coincides with the horizontal direction when the digital camera 1 is in its portrait orientation, and the Y axis direction coincides with the vertical direction when the digital camera 1 is in its landscape orientation. In the following description, "front" means on the subject side of the digital camera 1 (the Z axis positive direction side), and "rear" means the opposite side from the subject side of the digital camera 1 (the user side, or the Z axis direction negative side).

Interchangeable Lens Unit

The basic configuration of the interchangeable lens unit 2 will be described through reference to FIGS. 1 to 12B. As shown in FIG. 1, the interchangeable lens unit 2 has the optical system L, a lens support mechanism 71 that supports the optical system L, a focus adjusting unit 72, an aperture adjusting unit 73, a blur correction unit 74, and a lens microcomputer 40.

(1) Optical System

The optical system L is a zoom lens system for forming an optical image of a subject, and is mainly made up of four lens groups. More specifically, as shown in FIGS. 12A and 12B, the optical system L has a first lens group G1 having a positive refractive power, a second lens group G2 having a negative refractive power, a third lens group G3 having a negative refractive power, and a fourth lens group G4 having a positive refractive power (an example of the first lens element).

The first lens group G1 has a first lens L1, and a second lens L2 disposed on the imaging sensor 11 side of the first lens L1. The first lens L1 is a negative meniscus lens having its convex side facing the subject side. The second lens L2 is a positive meniscus lens having its convex face that faces the subject side, and is bonded to the first lens L1 via an adhesive layer.

The second lens group G2 has a third lens L3, a fourth lens L4 disposed on the imaging sensor 11 side of the third lens L3, and a fifth lens L5 disposed on the imaging sensor 11 side of the fourth lens L4. The third lens L3 is a negative meniscus lens having a convex face that faces the subject side. The fourth lens L4 is a biconcave lens. The fifth lens L5 is a biconvex lens.

The third lens group G3 is made up of a sixth lens L6 (an example of a focus lens). The sixth lens L6 is a negative meniscus lens having a convex face that faces the imaging sensor 11 side, and is disposed in the Z axis direction between the fifth lens L5 and a seventh lens L7 (in the Z axis direction between the second lens group G2 and the fourth lens group G4).

The fourth lens group G4 has the seventh lens L7, an eighth lens L8, a ninth lens L9, a tenth lens L10, an eleventh lens L11, and a twelfth lens L12. The seventh lens L7 is a positive meniscus lens for blur correction, and has a convex face that faces the imaging sensor 11 side. The eighth lens L8 is a biconvex lens. The ninth lens L9 is a biconcave lens, and is joined to the eighth lens L8 via an adhesive layer. The tenth lens L10 is a biconvex lens. The face of the tenth lens L10 on the subject side is aspherical. The eleventh lens L11 is a negative meniscus lens having a convex face that faces the subject side, and is joined to the tenth lens L10 via an adhesive layer. The twelfth lens L12 is a biconvex lens.

As shown in FIGS. 12A, 12B, and 13, when zooming in from the wide angle end to the telephoto end, the first lens group G1 to fourth lens group G4 each move in the Z axis direction along the optical axis AZ toward the subject side. More precisely, when zooming in from the wide angle end to the telephoto end, the space between the first lens group G1 and the second lens group G2 increases, the space between the second lens group G2 and the third lens group G3 increases, and the space between the third lens group G3 and the fourth lens group G4 decreases. An aperture unit 62 (discussed below) moves to the subject side along with the fourth lens group G4.

When focusing from an infinity focal state to a close focal state, the third lens group G3 moves along the optical axis AZ to the subject side.

Furthermore, the seventh lens L7 moves in two directions perpendicular to the optical axis AZ in order to suppress blurring in the optical image attributable to movement of the digital camera 1.

(2) Lens Support Mechanism

The lens support mechanism 71 is for movably supporting the optical system L, and has the lens mount 95, a fixed frame 50, a cam barrel 51, a first holder 52, a first lens group support frame 53, a second lens group support frame 54, a second holder 55, a third lens group support frame 56, a fourth lens group support frame 61, a zoom ring unit 83, and a focus ring unit 88.

The lens mount 95 is the portion that is mounted to the camera body 3, and has a lens-side contact 91. The fixed frame 50 is a member that rotatably supports the cam barrel 51, and is fixed to the lens mount 95. The fixed frame 50 has a protrusion 50a at the end on the Z axis direction positive side, three concave portions 50b provided to the outer periphery, and three linear through-grooves 50c disposed at an equal pitch around the optical axis AZ. The cam barrel 51 has three convex portions 51a provided to the inner periphery, three first cam grooves 51d, three second cam grooves 51b, and three third cam grooves 51c. Since the convex portions 51a of the cam barrel 51 are inserted into the concave portions 50b of the fixed frame 50, the cam barrel 51 is supported by the fixed frame 50 to be rotatable with respect to the fixed frame 50 in a state in which relative movement is restricted in the Z axis direction.

The first lens group support frame 53 is fixed to the first holder 52 and supports the first lens group G1. The first holder 52 has a longitudinal groove 52a that is formed on the inner peripheral side and extends in the Z axis direction, and three cam pins 81 that are disposed at a constant pitch around the optical axis AZ. The protrusion 50a of the fixed frame 50 is inserted in the longitudinal groove 52a. The cam pins 81 are inserted in the first cam grooves 51d of the cam barrel 51. This configuration allows the first holder 52 to move in the Z axis direction without rotating with respect to the fixed frame 50. The amount of movement of the first holder 52 with respect to the fixed frame 50 is determined by the shape of the first cam grooves 51d. Female threads 52c for attaching a conversion lens and an optical filter, such as a polarizing filter or a protective filter, are formed at the distal end of the first holder 52.

The second lens group support frame 54 is fixed to the second holder 55 and supports the second lens group G2. The second lens group support frame 54 and second holder 55 constitute the second lens group unit 77. The second holder 55 has three convex portions 55b that are disposed at a constant pitch around the optical axis AZ, and three cam pins 82 that are fixed to the convex portions 55b. The cam pins 82 are inserted into the second cam grooves 51b. The convex portions 55b are inserted into the linear through-grooves 50c of the fixed frame 50. This configuration allows the second lens group support frame 54 and the second holder 55 to move in the Z axis direction without rotating with respect to the fixed frame 50. The amount of movement of the second lens group support frame 54 and the second holder 55 with respect to the fixed frame 50 is determined by the shape of the second cam grooves 51b.

The third lens group support frame 56 is a member that supports the third lens group G3 (more precisely, the sixth lens L6 that functions as a focus lens), and has a bearing portion 56a, an anti-rotation portion 56b, a rack support 56c, and a protrusion 56d. The sixth lens L6 and the third lens group support frame 56 constitute the focus lens unit 75. The second holder 55 supports the front ends of two guide poles 63a and 63b that extend in the Z axis direction. A guide pole support plate 65 is a member for supporting the rear end of the guide pole 63a, and is fixed on the imaging sensor 11 side of the second holder 55. The guide pole 63a is inserted into the bearing portion 56a, and the guide pole 63b is inserted into the anti-rotation portion 56b. The third lens group support frame 56 is supported movably in the Z axis direction by the guide poles 63a and 63b while being restricted in rotation around the optical axis AZ.

The rack support 56c is a portion that extends from the bearing portion 56a to the Z axis direction negative side, and supports a rack 66 rotatably and movably integrally in the axial direction. The rack 66 has a rack main body 66a having a plurality of teeth 66c, and a shaft 66b that extends in the Z axis direction. The plurality of teeth 66c mesh with a lead screw 64a of a focus motor 64. The shaft 66b is supported by the rack support 56c, so the rack 66 is able to rotate around the center axis R with respect to the rack support 56c.

Figure 11:
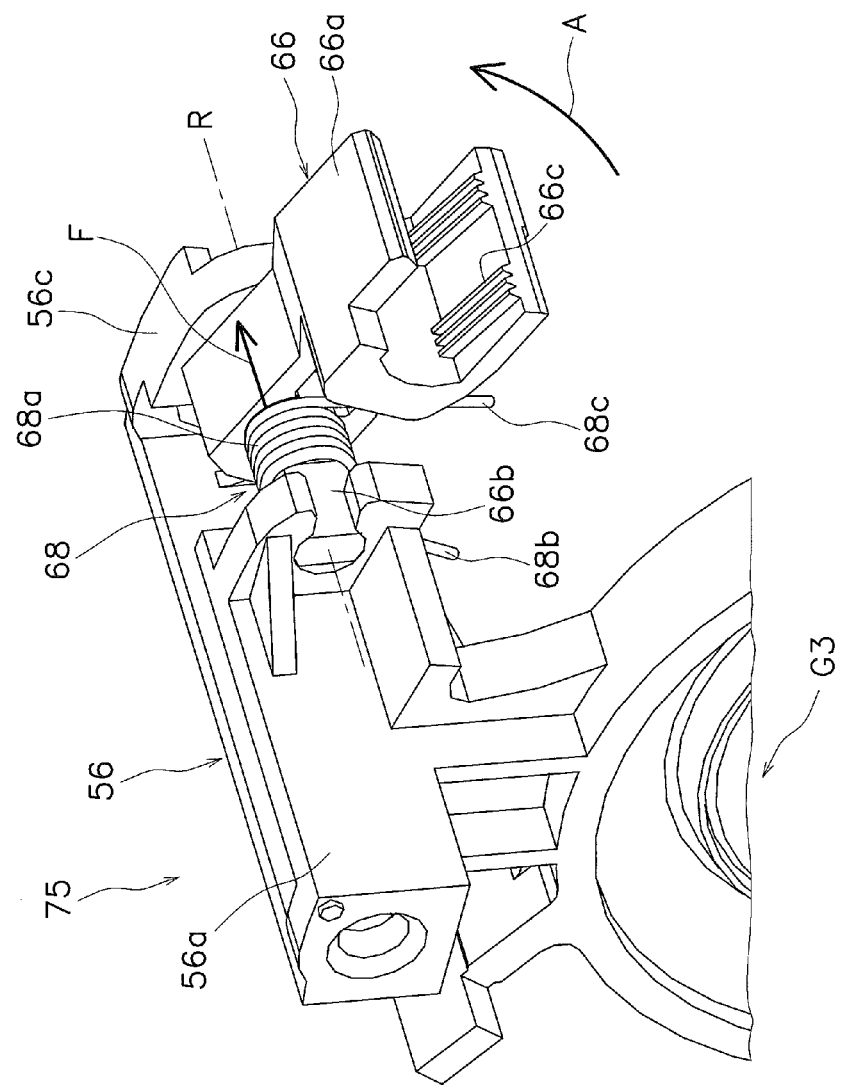
FIG. 11 is a partial oblique view of a focus lens unit.

As shown in FIGS. 9 and 11, a torsion coil spring 68 is attached to the rack support 56c. The torsion coil spring 68 has a wound portion 68a that generates elastic force, a first end 68b, and a second end 68c. The wound portion 68a is fitted to the shaft 66b of the rack 66. With the wound portion 68a twisted, the first end 68b is hooked onto the rack support 56c, while the second end 68c is hooked onto the rack 66. That is, the torsion coil spring 68 imparts rotational force in an A direction to the rack 66, and constantly presses the rack 66 against the lead screw 64a. This reduces backlash between the rack 66 and the lead screw 64a, and increases the positional accuracy of the focus lens unit 75. Also, since the rack 66 is constantly pressed against the lead screw 64a, drive force can be transmitted more efficiently from the lead screw 64a to the rack 66.

The wound portion 68a of the torsion coil spring 68 is also compressed in the Z axis direction (the direction parallel to the center axis R) between the rack support 56c and the rack 66. The torsion coil spring 68 imparts a pressing force F to the rack 66, and the torsion coil spring 68 presses the rack 66 against the rack support 56c. This reduces movement of the rack 66 in the Z axis direction with respect to the rack support 56c, and further improves the positional accuracy of the focus lens unit 75.

The focus motor 64 is fixed to the second holder 55. The focus motor 64 is a stepping motor, for example. The focus motor 64 has the lead screw 64a as its rotational shaft extending in the Z axis direction. This lead screw 64a meshes with the rack 66.

The protrusion 56d is a portion for detecting the starting point of the focus lens unit 75, and is provided at a location that can pass through the detection region of a photosensor 67 (discussed below). In this embodiment, since the third lens group G3 (a focus lens group) is formed by the sixth lens L6 alone, the weight of the third lens group G3 can be 1 g or less, for example, which allows the drive speed with the focus motor 64 to be higher.

The fourth lens group support frame 61 has a first support frame 57, a second support frame 58, a third support frame 59, and a fourth support frame 60. The fourth lens group G4 and the fourth lens group support frame 61 constitute a fourth lens group unit 78.

The first support frame 57 supports the seventh lens L7. The second support frame 58 supports the eighth lens L8 and the ninth lens L9, and also supports the first support frame 57 movably in two directions perpendicular to the optical axis AZ. The second support frame 58 has three cam pins 80 that are disposed at a constant pitch around the optical axis AZ.

The third support frame 59 supports the tenth lens L10 and the eleventh lens L11, and is fixed by screws, for example, to the second support frame 58. The fourth support frame 60 supports the twelfth lens L12, and is fixed by screws, for example, to the third support frame 59. Because of their configuration, the first support frame 57, the second support frame 58, the third support frame 59, and the fourth support frame 60 move integrally along the optical axis AZ.

The first support frame 57 is supported by the second support frame 58 to be movable in two directions perpendicular to the optical axis AZ, for example. This configuration allows the first support frame 57 to move integrally in the Z axis direction with respect to the second support frame 58, the third support frame 59, and the fourth support frame 60, while allowing movement in a direction perpendicular to the optical axis AZ.

The zoom ring unit 83 has a ring base 86, the zoom ring 84, and a linear position sensor 87 that detects the rotational position of the zoom ring 84. The "rotational position of the zoom ring 84" refers to the position of the zoom ring 84 in the rotational direction, and can also be considered to be the rotational angle of the zoom ring 84 from a reference position.

The zoom ring 84 has a cylindrical shape, and is supported by the ring base 86 fixed to the fixed frame 50, to be movable around the optical axis AZ in a state in which movement in the Z axis direction is restricted. The zoom ring 84 has a through-hole 84a at the end on the Z axis direction negative side. A zoom drive pin 85 that is fixed to the cam barrel 51 is inserted into the through-hole 84a. Consequently, the cam barrel 51 rotates integrally with the zoom ring 84 around the optical axis AZ.

The linear position sensor 87 detects the rotational position and rotational direction in which the user has put the zoom ring 84, and sends the detection result to the lens microcomputer 40. More specifically, the linear position sensor 87 is fixed to the ring base 86 and has a slider 87a that protrudes outward in the radial direction. This slider 87a is inserted into a cam groove 84b formed in the zoom ring 84. When the zoom ring 84 rotates with respect to the fixed frame 50, the slider 87a moves in the Z axis direction along the cam groove 84b. The linear position sensor 87 has a varistor, and when the slider 87a slides over a magnetic resistor that is inside this varistor, output (output voltage) that is proportional to the position of the slider 87a in the Z axis direction can be obtained linearly between terminals at both ends to which a specific voltage has been applied. The output of the linear position sensor 87 is converted into rotational position information, which allows the rotational position of the zoom ring 84 to be detected. The focal distance of the optical system L is displayed on the outer peripheral face of the zoom ring 84.

Since the first lens group G1 to fourth lens group G4 are mechanically linked via the lens support mechanism 71, the absolute positions of the first lens group G1 to fourth lens group G4 (such as their positions using a light receiving face 11a of the imaging sensor 11 as a reference) have a specific relation to the rotational position of the zoom ring 84. Therefore, if the rotational position of the zoom ring 84 is detected, the absolute positions of the first lens group G1 to fourth lens group G4 with respect to the lens mount 95 can be ascertained. The zoom ring 84 may have another structure instead, such as a movable lever.

The focus ring unit 88 has a focus ring 89 and a focus ring angle detector 90 that detects the rotational angle of the focus ring 89. The focus ring 89 has a cylindrical shape, and is supported by the ring base 86 rotatably around the optical axis AZ in a state in which movement in the Z axis direction is restricted. The rotational angle and rotational direction of the focus ring 89 can be detected by the focus ring angle detector 90. The focus ring angle detector 90 has two photosensors (not shown), for example. The focus ring 89 has a plurality of protrusions 89a that protrude inward in the radial direction and are disposed at equidistant spacing in the rotational direction. Each of these photosensors has a light emitting part (not shown) and a light receiving part (not shown), and the plurality of protrusions 89a pass in between the light emitting parts and the light receiving parts, allowing the rotational angle and rotational direction of the focus ring 89 to be detected. The focus ring 89 may have another structure instead, such as a movable lever.

(3) Focus Adjusting Unit

The focus adjusting unit 72 has the focus motor 64, a focus drive controller 41, and the photosensor 67. The focus motor 64 is fixed to the second holder 55 and drives the focus lens unit 75 in the Z axis direction with respect to the second lens group unit 77. The drive of the focus lens unit 75 with respect to the second lens group unit 77 is performed by the focus motor 64 alone. In other words, in a state in which the focus motor 64 is not driving the focus lens unit 75 (such as when no power is being supplied to the focus motor 64), the focus lens unit 75 cannot be moved with respect to the second lens group unit 77. In this case, the focus lens unit 75 moves in the Z axis direction integrally with the second holder 55.

The lead screw 64a of the focus motor 64 rotates on the basis of a drive signal inputted from the focus drive controller 41. The rotary motion generated by the focus motor 64 is converted by the lead screw 64a and the rack 66 into linear motion of the focus lens unit 75 in the Z axis direction. Consequently, the focus lens unit 75 can move in the Z axis direction with respect to the second lens group unit 77.

With this digital camera 1, to achieve a zoom lens system with which the focal distance can be varied while keeping the subject distance substantially constant, the focus lens unit 75 is driven by the focus adjusting unit 72 on the basis of a tracking table stored ahead of time in the lens microcomputer 40. This type of tracking is called electronic tracking here.

The tracking table contains information indicating the position of the focus lens unit 75 where the focused subject distance remains substantially constant even if the focal distance changes (more precisely, the position of the focus lens unit 75 with respect to the second lens group unit 77). The phrase "the subject distance remains substantially constant" means that the amount of change in the subject distance falls within a specific subject field depth. Electronic tracking will be discussed below.

The photosensor 67, which detects the starting point position of the focus lens unit 75, is installed in the second holder 55. This photosensor 67 has a light emitting part (not shown) and a light receiving part (not shown). When the protrusion 56d of the third lens group support frame 56 passes between the light emitting part and the light receiving part, the photosensor 67 can detect the presence of the protrusion 56d. That is, the starting point position of the focus lens unit 75 with respect to the second lens group unit 77 can be detected by the photosensor 67. In other words, the photosensor 67 is a starting point detector that detects the starting point position of the third lens group G3 with respect to the second lens group G2. The lens microcomputer 40 drives the third lens group G3 to the starting point position, and checks whether the focus lens unit 75 (the third lens group G3) is in the starting point position by using a signal from the photosensor 67.

The starting point position that can be detected by the photosensor 67 is an absolute position that never moves with respect to the second lens group unit 77. Accordingly, when the position of the focus lens unit 75 is reset to the starting point position with respect to the second lens group unit 77, the photosensor 67 drives the focus lens unit 75 to the position where the protrusion 56d for starting point detection is detected. For example, when a power switch 25 of the digital camera 1 is turned off, the focus motor 64 drives the focus lens unit 75 to the position where the protrusion 56d of the third lens group support frame 56 is detected, regardless of the current position of the focus lens unit 75. Upon completion of the drive of the focus lens unit 75, the power to the digital camera 1 is turned off. Conversely, when the power switch 25 of the digital camera 1 is turned on, the focus motor 64 drives the focus lens unit 75 to a specific position determined on the basis of the tracking table. The starting point detector is not limited to being a photosensor, and may instead be a combination of a magnet and a magnetic sensor, for example.

(4) Aperture Adjusting Unit

The aperture adjusting unit 73 has the aperture unit 62 fixed to the second support frame 58, an aperture drive motor (not shown) that drives the aperture unit 62, and an aperture drive controller 42 that controls the aperture drive motor. The aperture drive motor is a stepping motor, for example. The aperture drive motor is driven on the basis of a drive signal inputted from the aperture drive controller 42. The drive force generated by the aperture drive motor drives aperture blades 62a in the opening and closing directions. The aperture value of the optical system L can be changed by driving the aperture blades 62a.

(5) Blur Correction Unit

The blur correction unit 74 is for reducing blurring of the optical image attributable to movement of the interchangeable lens unit 2 and the camera body 3, and has an electromagnetic actuator 46, a position detecting sensor 47, and a blur correction microcomputer 48.

The electromagnetic actuator 46 drives the first support frame 57 in a direction perpendicular to the optical axis AZ. More specifically, the electromagnetic actuator 46 has a magnet (not shown) and a coil (not shown), for example. For instance, the coil is provided to the first support frame 57, and the magnet is fixed to the second support frame 58.

The position detecting sensor 47 is for detecting the position of the first support frame 57 with respect to the second support frame 58, and is a Hall element, for example. A movement detecting sensor (not shown) such as a gyro sensor is installed in the interchangeable lens unit 2. The blur correction microcomputer 48 controls the electromagnetic actuator 46 on the basis of the detection result of the position detecting sensor 47 and the detection result of the movement detecting sensor. Consequently, blurring of the optical image attributable to movement of the digital camera 1 can be reduced.

Reducing blurring of the subject image may instead be accomplished by electronic blur correction, in which blurring that appears in an image is corrected on the basis of image data outputted from the imaging sensor 11. Also, blurring of the subject image may be reduced by a sensor shift method in which the imaging sensor 11 is driven in two directions perpendicular to the optical axis AZ.

(6) Lens Microcomputer

The lens microcomputer 40 has a CPU (not shown), a ROM (not shown), and a memory 40a, and various functions can be performed by reading programs stored in the ROM into the CPU. For instance, the lens microcomputer 40 can check whether the focus lens unit 75 is in the starting point position by using a detection signal from the photosensor 67.

The memory 40a is a nonvolatile memory, and can hold stored information even when the power supply has been halted. The memory 40a contains a tracking table (discussed below) for realizing a zoom lens system, or information related to the interchangeable lens unit 2 (lens information), for example. The lens microcomputer 40 controls the focus motor 64, and the focus lens unit 75 is driven by the focus motor 64 in the Z axis direction, on the basis of this tracking table. An operation in which the position of the focus lens unit 75 is made to conform to changes in the focal distance on the basis of a tracking table will hereinafter be referred to as electronic tracking.

The lens microcomputer 40 has a counter 40b for counting the number of pulses of the focus motor 64. The counter 40b is set to a count of "+1" when the focus lens unit 75 is driven to the Z axis direction positive side, and to a count of "−1" when the focus lens unit 75 is driven to the Z axis direction negative side. The relative position of the third lens group G3 with respect to the second lens group G2 (the position of the focus lens unit 75 with respect to the second lens group unit 77) can be ascertained by thus counting the number of drive pulses of the focus motor 64.

For example, the rack 66 is driven 0.6 mm in the Z axis direction for every rotation of the lead screw 64a of the focus motor 64. If the focus motor 64, which has a 10-pole magnet (not shown), is driven by 1-2 phase excitation, then the rack 66 is driven 0.6/20/2=0.015 mm (15 μm) in the Z axis direction per pulse. During micro-step drive, the rack 66 can be driven in even finer units. Using a stepping motor allows the focus lens unit 75 to be driven in fine units, and reduces backlash during reverse drive, for example. That is, selecting a stepping motor as the focus motor 64 affords very precise focus adjustment. Also, counting the number of drive pulses allows the current position of the focus lens unit 75 with respect to the second lens group unit 77 to be ascertained, and allows the amount of drive of the focus lens unit 75 to be calculated.

Camera Body

The basic configuration of the camera body 3 will be described through reference to FIGS. 1 to 4B. As shown in FIGS. 1 to 4B, the camera body 3 has a housing 3a, a body mount 4 (an example of a mounting portion), a control unit 39, an image acquisition section 35, an image display unit 36, a viewfinder unit 38, a body microcomputer 10 (an example of a position information acquisition section, and an example of a corrector), and a battery 22.

(1) Housing

The housing 3a constitutes the outer part of the camera body 3. As shown in FIGS. 4A and 4B, the body mount 4 is provided to the front face of the housing 3a, and the control unit 39 is provided to the rear and top faces of the housing 3a. More specifically, a display unit 20, the power switch 25, a mode selector dial 26, a directional arrow key 27, a menu setting button 28, a set button 29, an imaging mode selector button 34, and a moving picture imaging button 24 are provided to the rear face of the housing 3a. A shutter button 30 is provided to the top face of the housing 3a.

(2) Body Mount

The body mount 4 is the portion of the interchangeable lens unit 2 where the lens mount 95 is mounted, and has a body-side contact (not shown) that can be electrically connected with the lens-side contact 91. The camera body 3 is able to send and receive data to and from the interchangeable lens unit 2 via the body mount 4 and the lens mount 95. For example, the body microcomputer 10 (discussed below) sends the lens microcomputer 40 a control signal, such as an exposure synchronization signal, via the body mount 4 and the lens mount 95.

(3) Control Unit

As shown in FIGS. 4A and 4B, the control unit 39 has various controls that the user can use to input operating information. For instance, the power switch 25 is a switch for turning the power on and off to the digital camera 1 or the camera body 3. When the power is turned on with the power switch 25, power is supplied to the various parts of the camera body 3 and the interchangeable lens unit 2.

The mode selector dial 26 is used to switch the operating mode, such as still picture imaging mode, moving picture imaging mode, or reproduction mode, and the user can turn the mode selector dial 26 to switch the operating mode. When the still picture imaging mode is selected with the mode selector dial 26, the operating mode is switched to the still picture imaging mode, and when the moving picture imaging mode is selected with the mode selector dial 26, the operating mode is switched to the moving picture imaging mode. In the moving picture imaging mode, moving picture imaging is possible. When the reproduction mode is selected with the mode selector dial 26, the operating mode is switched to the reproduction mode, allowing the captured image to be displayed on the display unit 20.

The directional arrow key 27 is used to select the left, right, up, and down directions. The user can use the directional arrow key 27 to select the desired menu from various menu screens displayed on the display unit 20, for example.

The menu setting button 28 is for setting the various operations of the digital camera 1. The set button 29 is for executing the operations of the various menus.

The moving picture imaging button 24 is for starting and stopping the capture of moving pictures. Even if the operating mode selected with the mode selector dial 26 is the still picture imaging mode or the reproduction mode, when the moving picture imaging button 24 is pressed, the operating mode is forcibly changed to the moving picture imaging mode, and moving picture imaging begins, regardless of the setting on the mode selector dial 26. When this moving picture imaging button 24 is pressed during the capture of a moving picture, the moving picture imaging ends and the operating mode changes to the one selected on the mode selector dial 26, that is, to the one prior to the start of moving picture imaging. For example, if the still picture imaging mode has been selected with the mode selector dial 26 when the moving picture imaging button 24 is pressed, the operating mode automatically changes to the still picture imaging mode after the moving picture imaging button 24 is pressed again.

The shutter button 30 is pressed by the user to capture an image. When the shutter button 30 is pressed, a timing signal is outputted to the body microcomputer 10. The shutter button 30 is a two-stage switch that can be pressed half way down or all the way down. Light measurement and ranging are commenced when the user presses the button half way down. When the user presses the shutter button 30 all the way down in a state in which the shutter button 30 has been pressed half way down, a timing signal is outputted, and image data is acquired by the image acquisition section 35.

As shown in FIG. 2, a lens attachment button 99 for attaching and removing the interchangeable lens unit 2 to and from the camera body 3 is provided to the front face of the camera body 3. The lens attachment button 99 has a contact (not shown) that is in its "on" state when the button is pressed by the user, for example, and is electrically connected to the body microcomputer 10. When the lens attachment button 99 is pressed, the built-in contact is switched on, and the body microcomputer 10 recognizes that the lens attachment button 99 has been pressed.

(4) Image Acquisition Section

The image acquisition section 35 mainly comprises the imaging sensor 11 (an example of an imaging element) such as a CCD (charge coupled device) that performs opto-electrical conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 11.

The imaging sensor 11 is a CCD (charge coupled device) sensor, for example, that converts the optical image formed by the optical system L into an electrical signal. The imaging sensor 11 is driven and controlled by timing signal generated by the imaging sensor driving controller 12. The imaging sensor 11 may instead be a CMOS (complementary metal oxide semiconductor) sensor.

The shutter controller 31 drives a shutter drive actuator 32 and operates the shutter unit 33 according to a control signal outputted from the body microcomputer 10 that has received a timing signal.

The auto-focus method that is employed in this embodiment is a contrast detection method that makes use of image data produced by the imaging sensor 11. Using a contrast detection method allows high-precision focal adjustment.

(5) Body Microcomputer

The body microcomputer 10 is a control device that is the command center of the camera body 3, and controls the various components of the digital camera 1 according to operation information inputted to the control unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 has the function of detecting that the interchangeable lens unit 2 has been mounted to the camera body 3, or the function of acquiring information that is necessary for controlling the digital camera 1, such as information about the focal distance from the interchangeable lens unit 2. The body microcomputer 10 also has the function of acquiring information about the position of the focus lens unit 75 from the interchangeable lens unit 2 (the function of a position information acquisition section), or the function of determining whether or not the standard of the interchangeable lens unit 2 matches the standard of the camera body 3 (the function of a correction determination section), and furthermore the function of acquiring a correction coefficient K (discussed below) from the interchangeable lens unit 2.

The body microcomputer 10 is able to receive signals from the power switch 25, the shutter button 30, the mode selector dial 26, the directional arrow key 27, the menu setting button 28, and the set button 29. Various information related to the camera body 3 is held in a memory 10a inside the body microcomputer 10. The memory 10a is a nonvolatile memory, and can hold stored information even when the power supply has been halted.

Also, the body microcomputer 10 periodically produces a vertical synchronization signal, and produces an exposure synchronization signal on the basis of the vertical synchronization signal in parallel with the production of the vertical synchronization signal. The body microcomputer 10 can produce an exposure synchronization signal, because the body microcomputer 10 ascertains beforehand the exposure start timing and the exposure stop timing based on the vertical synchronization signal. The body microcomputer 10 outputs a vertical synchronization signal to a timing generator (not shown), and outputs an exposure synchronization signal at a specific period to the lens microcomputer 40 via the body mount 4 and the lens mount 95. The lens microcomputer 40 acquires position information about the focus lens unit 75 in synchronization with the exposure synchronization signal.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer component (not shown) the image data produced by numerous opto-electrical conversion elements (not shown) present in the imaging sensor 11, according to the read signal.

The body microcomputer 10 also controls the focus adjusting unit 72 (discussed below) via the lens microcomputer 40.

The image signal outputted from the imaging sensor 11 is sent to and successively processed by an analog signal processor 13, an A/D converter 14, a digital signal processor 15, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement. The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JEPG can be used to compress a plurality of image signals, compressing an image signal for each frame, and an H.264/AVC method can also be used, in which compression is performed on image signals for a plurality of frames all at once.

The image recorder 18 produces a still picture file or moving picture file that is associated with specific information to be recorded with the image signal, on the basis of a command from the image recording controller 19. The image recorder 18 also records the still picture file or moving picture file on the basis of a command from the image recording controller 19. The image recorder 18 is a removable memory and/or an internal memory, for example. The specific information to be recorded with the image signal includes the date and time the image was captured, focal distance information, shutter speed information, aperture value information, and imaging mode information. Still picture files are in Exif (registered trademark) format or a format similar to Exif (registered trademark) format, for example. Moving picture files are in H.264/AVC format or a format similar to H.264/AVC format, for example.

(6) Image Display Unit

The image display unit 36 has the display unit 20 and an image display controller 21. The display unit 20 is a liquid crystal monitor, for example. The display unit 20 displays as a visible image the image signal recorded to the buffer memory 16 or the image recorder 18 on the basis of a command from the image display controller 21. Possible display modes on the display unit 20 include a display mode in which only the image signal is displayed as a visible image, and a display mode in which the image signal and information from the time of capture are displayed as a visible image.

(7) Viewfinder

The viewfinder unit 38 has a liquid crystal viewfinder 8 that displays the image acquired by the imaging sensor 11, and a viewfinder eyepiece window 9 provided to the rear face of the housing 3a. The user looks into the viewfinder eyepiece window 9 to view the image displayed on the liquid crystal viewfinder 8.

(8) Battery

The battery 22 supplies power to the various components of the camera body 3, and also supplies power to the interchangeable lens unit 2 via the lens mount 95. In this embodiment, the battery 22 is a rechargeable battery. The battery 22 may be a dry cell, or an external power supply may be used, with which power is supplied from the outside through a power cord.

Tracking Table

Figure 14:
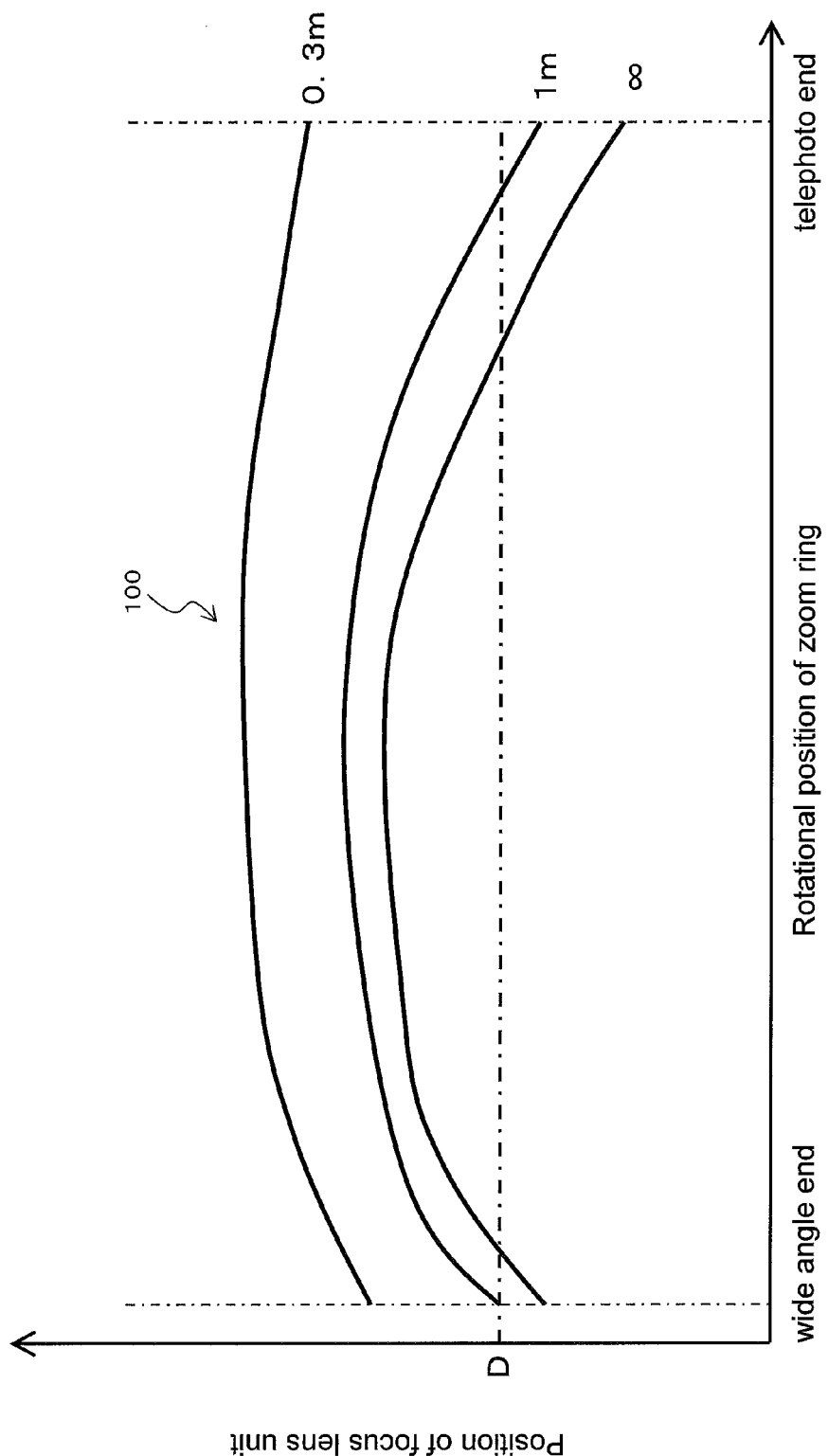
FIG. 14 is a tracking table for a zoom lens system.

With the digital camera 1, electronic tracking is performed by the focus adjusting unit 72 so that the focal distance can be varied while the subject distance is kept substantially constant. More specifically, as shown in FIG. 14, a tracking table 100 is held in the memory 40a in order to perform electronic tracking. This tracking table 100 shows the relation between the rotational position of the zoom ring 84 and the position of the focus lens unit 75 in the Z axis direction with respect to the second lens group unit 77. For example, the memory 40a holds three tracking tables 100 corresponding to subject distances of 0.3 m, 1.0 m, and infinity ($\infty$).

The tracking table 100 consists of discrete information in which the rotational position of the zoom ring 84 and the position of the focus lens unit 75 in the Z axis direction are divided into several groups. In general, the number of divisions is determined so that the subject distance will fit within a specific subject field depth when the zoom ring 84 is turned.

The rotational position of the zoom ring 84 (position in the rotational direction) can be detected by the linear position sensor 87. On the basis of this detection result and the tracking table 100, the lens microcomputer 40 can determine the position of the focus lens unit 75 in the Z axis direction with respect to the second lens group unit 77.

The starting point position D of the focus lens unit 75 with respect to the second lens group unit 77 is detected by the photosensor 67, which is indicated by the one-dot chain line in FIG. 14. In this embodiment, the starting point position D is located near the center of the movement range of the focus lens unit 75 (between positions E1 and E2) in the infinity tracking table 100. Thus disposing the starting point position D near the center allows the focus lens unit 75 to be moved relatively quickly to any position when the power is turned on to the digital camera 1.

The reason the starting point position D is determined using the infinity tracking table 100 as a reference is that there is a higher probability of capturing the subject at the infinity position when the user turns on the power to the digital camera 1 to photograph the subject.

The tracking table 100 may also be expressed by a polynomial, rather than discrete information divided into several groups. Position information about the first lens group G1, second lens group G2, or fourth lens group G4 in the Z axis direction may also be used instead of the rotational position of the zoom ring 84. The "position of the focus lens unit 75 in the Z axis direction with respect to the second lens group unit 77" can be rephrased as the position of the third lens group G3 in the Z axis direction with respect to the second lens group unit 77, or the position of the third lens group G3 in the Z axis direction with respect to the second lens group G2.

Digital Cameras of Different Standards

Figure 15:
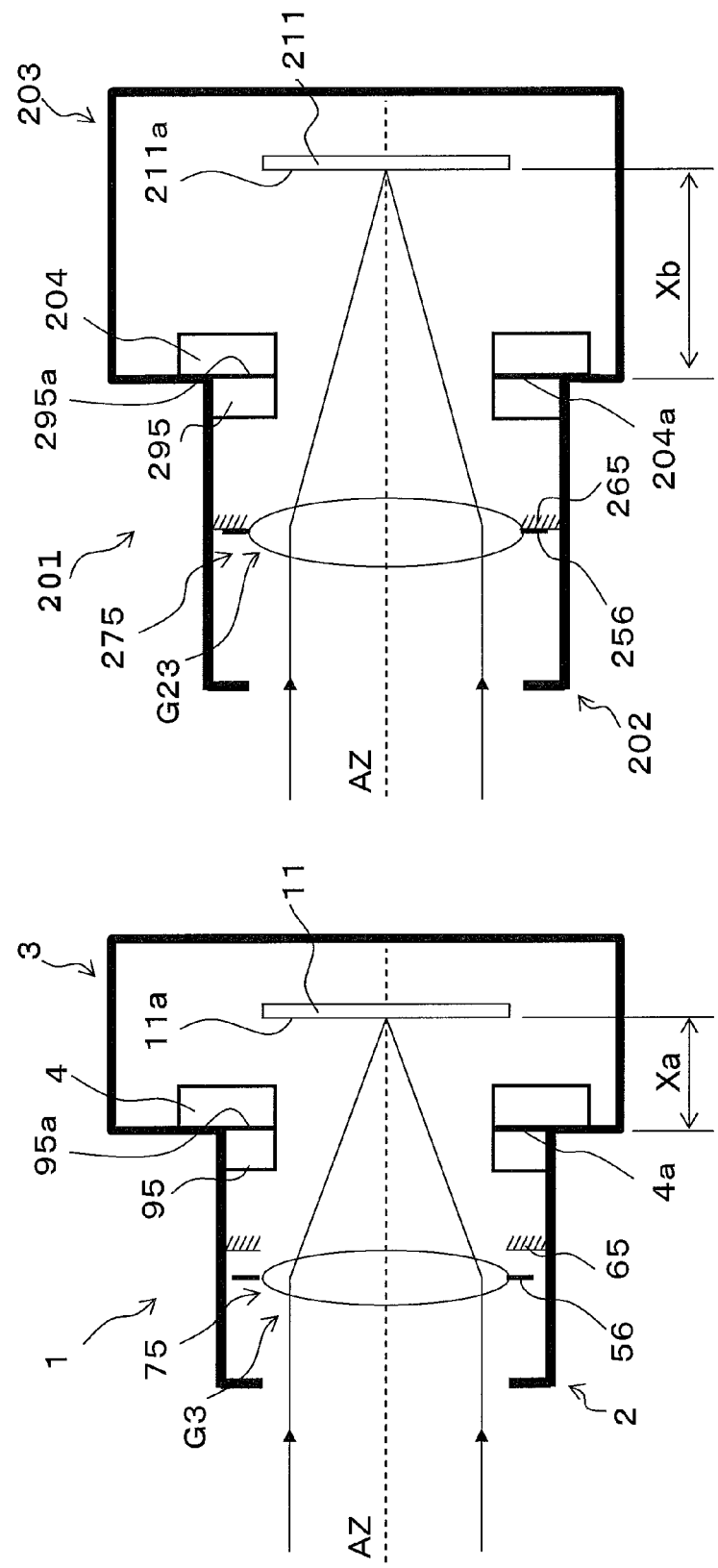
FIGS. 15A and 15B are simplified diagrams of a digital camera.

A digital camera 201 having a flange back of a different standard from that of the digital camera 1 discussed above will now be described. FIG. 15A is a simplified diagram of the digital camera 1, and FIG. 15B is a simplified diagram of the digital camera 201.

As shown in FIG. 15A, the digital camera 1 has the interchangeable lens unit 2 and the camera body 3 having a flange back Xa. The digital camera 1 conforms to a first standard in which a quick return mirror is not used. More specifically, the shapes of the body mount 4 and the lens mount 95 conform to the first standard. The flange back Xa of the camera body 3 conforms to first standard, and the optical system L is designed to match the flange back Xa.

Meanwhile, as shown in FIG. 15B, the digital camera 201 has an interchangeable lens unit 202 and a camera body 203 having a flange back Xb. The interchangeable lens unit 202 conforms to a second standard in which a quick return mirror is used.

The flange back Xa here is the distance in the Z axis direction from the mounting face 4a (reference face) of the body mount 4 to the light receiving face 11a of the imaging sensor 11, and coincides with the lens back of the interchangeable lens unit 2 as designed. The lens back Xa of the interchangeable lens unit 2 is the distance from the mounting face 95a of the lens mount 95 to the rear focal point. The body mount 4 and the lens mount 95 have shapes that allow them to be mounted to each other according to the first standard. In a state in which the body mount 4 has been mounted to the lens mount 95, the mounting face 4a of the body mount 4 and the mounting face 95a of the lens mount 95 are in contact with each other.

The flange back Xb is the distance in the Z axis direction from the mounting face 204a of a body mount 204 to the light receiving face 211a of an imaging sensor 211, and coincides with the lens back of the interchangeable lens unit 202 as designed. The lens back Xb of the interchangeable lens unit 202 is the distance from the mounting face 295a of the lens mount 295 to the rear focal point. The body mount 204 and the lens mount 295 have shapes that allow them to be mounted to each other according to the second standard. In a state in which the body mount 204 has been mounted to the lens mount 295, the mounting face 204a of the body mount 204 and the mounting face 295a of the lens mount 295 are in contact with each other.

An interchangeable lens type of digital camera is characterized by the fact that it can be used with a separate interchangeable lens unit mounted to the camera body. For example, it is conceivable that the interchangeable lens unit 202 would be mounted to the camera body 3.

However, since the digital camera 201 conforms to a second standard in which a quick return mirror is used, the flange back Xb of the camera body 203 (the lens back Xb of the interchangeable lens unit 202) is longer than the flange back Xa of the camera body 3. Since the lens back Xb of the interchangeable lens unit 202 is longer than the flange back Xa of the camera body 3, the lens back Xb of the interchangeable lens unit 202 does not match the flange back Xa of the camera body 3. Accordingly, the interchangeable lens unit 202 cannot be used directly as an interchangeable lens unit for the camera body 3.

Figure 16:
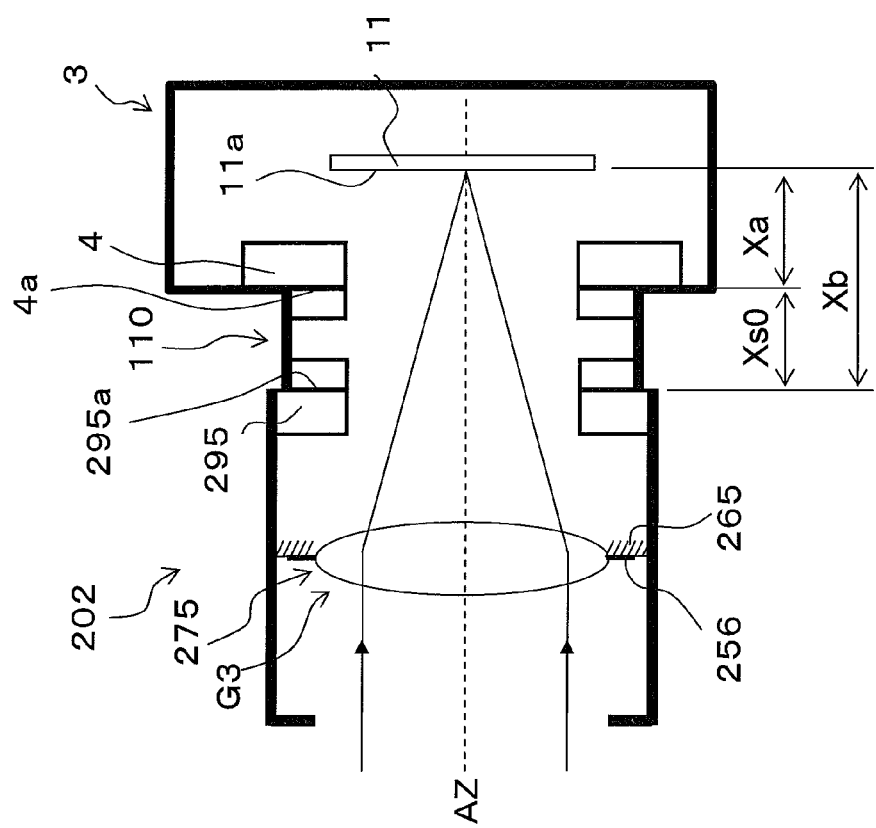
FIG. 16 is a simplified diagram of a digital camera.

In view of this, it is possible to use an adapter 110 for adjusting the back length when mounting the interchangeable lens unit 202 to the camera body 3. Specifically, as shown in FIG. 16, the interchangeable lens unit 202 is mounted to the camera body 3 via the adapter 110. In this case, the adapter length Xs0 is set to be the difference between the flange back Xa of the camera body 3 and the lens back Xb of the interchangeable lens unit 202 (that is, the lens back Xb of the camera body 203). More specifically, the adapter length Xs0 (reference length) can be expressed by the following formula (1).

[Mathematical Formula 1]

$$Xs0 = Xb - Xa \quad (1)$$

Using this adapter 110 allows the flange back to be adjusted so that the interchangeable lens unit 202 can be used as the interchangeable lens unit of the camera body 3.

With the camera body 3, however, a contrast detection method (hereinafter referred to as contrast AF) is employed as the auto focusing method, but even if the flange back is adjusted using the adapter 110, that alone will not allow the interchangeable lens unit 202 to be compatible with the operation of contrast AF. Auto focus (AF) by contrast detection method will now be described.

When auto focus is performed by contrast detection, the evaluation value for auto focusing (hereinafter referred to as the AF evaluation value) is computed by the body microcomputer 10 on the basis of image data acquired by the imaging sensor 11. The computed AF evaluation value is stored in a DRAM (not shown) in a state of being associated with the position of the focus lens unit 75 acquired in synchronization with the exposure synchronization signal. The body microcomputer 10 selects as the focal point the position of the focus lens unit 75 at which the AF evaluation value is at its maximum, on the basis of the AF evaluation value stored in the DRAM. The method for driving the focus lens unit 75 in the selection of the focal point is generally known as a hill climbing method.

Figures 17A, 17B, 17C, 17D:
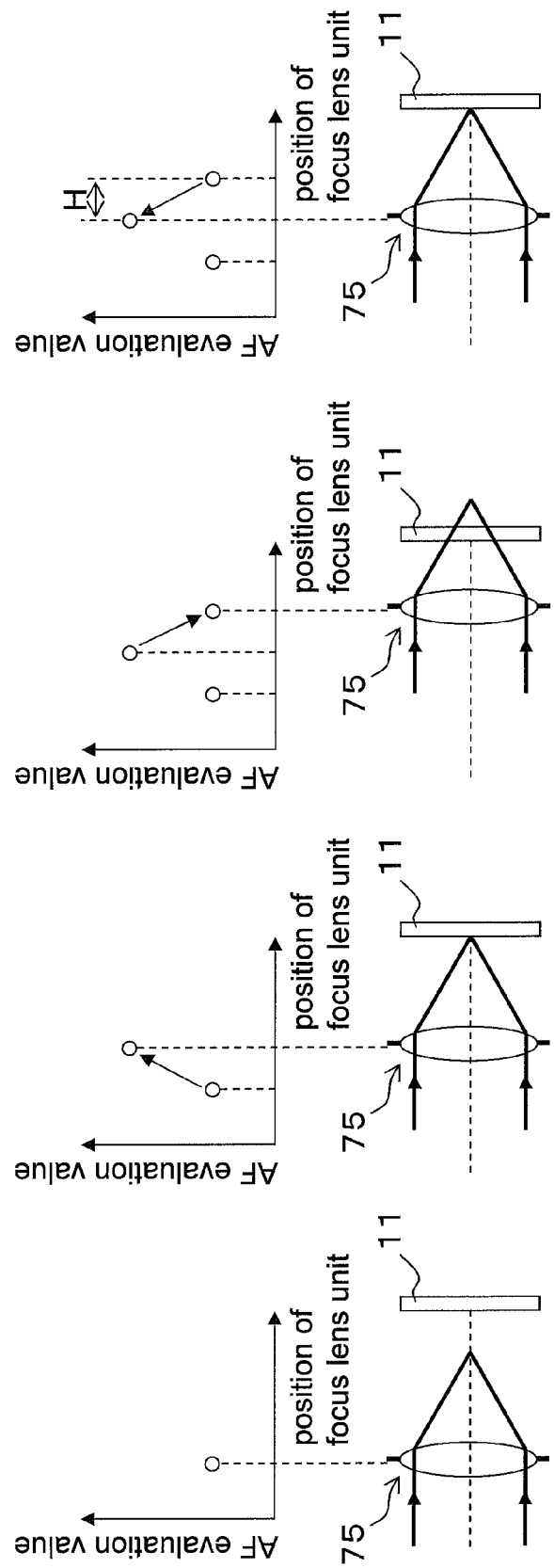
FIGS. 17A to 17D illustrate the operation of a focus lens unit in contrast AF.

As shown in FIGS. 17A to 17D, for example, with a hill climbing method, the focus lens unit 75 is moved in the direction of increasing the AF evaluation value, and the AF evaluation value is found for each position of the focus lens unit 75. This operation is continued until the maximum value for the AF evaluation value is detected, that is, until the AF evaluation value increases up to its peak and then begins to decrease. More specifically, when the AF evaluation value reaches its maximum at the position of the focus lens unit 75 shown in FIG. 17B, the focus lens unit 75 is first driven to the position shown in FIG. 17C, and the focus lens unit 75 is moved to the position at which the AF evaluation value reaches its maximum as shown in FIG. 17D. Thus, when auto focusing is performed by contrast detection method, the focus lens unit 75 has to be moved an extra amount, so a margin range H must be provided at both ends of the range over which the focus lens unit 75 stops in a focused state (hereinafter this will also be referred to as the focal range). For example, one end of the focal range is the position where the focus lens unit 75 stops in a state of being focused with the object distance at infinity, and to detect the maximum value at this position, the focus lens unit 75 must be moved beyond this position in the margin range H.

However, it is usually not assumed that a conventional interchangeable lens unit will be compatible with contrast AF, and there are many interchangeable lens units with which this margin range H is not provided, as is the case with the abovementioned interchangeable lens unit 202. For example, as shown in FIG. 16, it is conceivable that in a state of being in focus at infinity, a focus lens unit 275 will have already reached the end of its mechanically determined movable range. In this case, since the operation of the focus lens unit 275 shown in FIGS. 17C and 17D cannot be carried out, contrast AF is impossible. If an interchangeable lens unit that is not compatible with contrast AF could be made to be compatible with contrast AF, then an interchangeable lens unit that was purchased in the past could also be used with the camera body 3.

Figure 18:
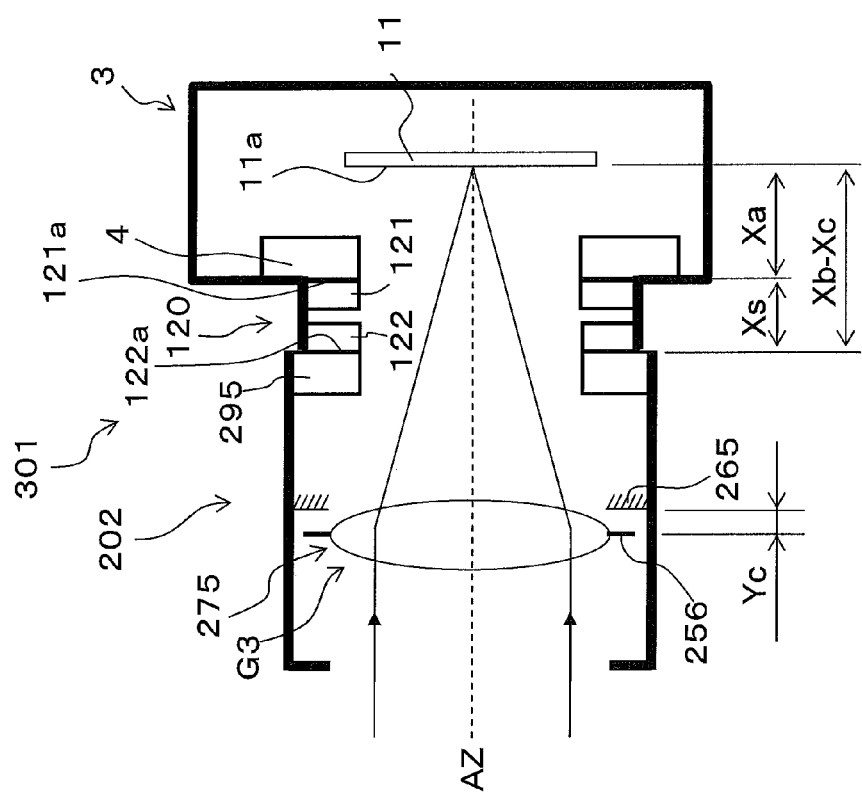
FIG. 18 is a simplified diagram of a digital camera.

In view of this, as shown in FIG. 18, it is possible to use an adapter 120, with which the adapter length is set to be shorter than the reference length Xs0, in place of the adapter 110 in order to make the interchangeable lens unit 202, which is not compatible with contrast AF, to be compatible with contrast AF. More specifically, the adapter length is set to be the adapter length Xs expressed by the following formula (2). Formula 2 is pre-stored in the body microcomputer 10, for example.

[Mathematical Formula 2]

$$Xs = Xb - Xa - Xc = Xs0 - Xc \quad (2)$$

In this case, as shown in FIG. 18, compared to when the adapter length is the reference length Xs0, the interchangeable lens unit 202 is closer to the camera body 3 by the distance Xc, so the focal range over which the focus lens unit 75 moves during focal adjustment is shifted to the Z axis direction positive side (the subject side) with respect to the mechanically determined focal range of the focus lens unit 75. As a result, if we consider the focal position closest to the imaging sensor 11 (infinity end), for example, a gap corresponding to the distance Xc (more precisely, the correction amount Yc discussed below) is ensured between the focus lens unit 275 and a guide pole support plate 265. Accordingly, by setting the distance Xc so that the margin range H can be ensured, there will be the margin range H at the infinity end of the focal range of the focus lens unit 75. Consequently, as shown in FIG. 18, it will be possible to focus at infinity by contrast AF even when the camera body 3 is combined with the interchangeable lens unit 202.

Thus, when the length of the adapter 120 is shortened as in Formula 2, there will be cases in which the interchangeable lens unit 202, with which no margin range H is ensured, can be used. Because imaging is so often performed with the subject distance at infinity, it is extremely useful to be able to focus at infinity by contrast AF.

The distance Xc is computed by the body microcomputer 10, for example, on the basis of the above-mentioned Formula 2. In computing the distance Xc, the body microcomputer 10 acquires the lens back Xb from a lens microcomputer 240 (discussed below), and acquires the adapter length Xs from an adapter microcomputer 123 (discussed below).

Configuration of Digital Camera Having Adapter

Figure 19:
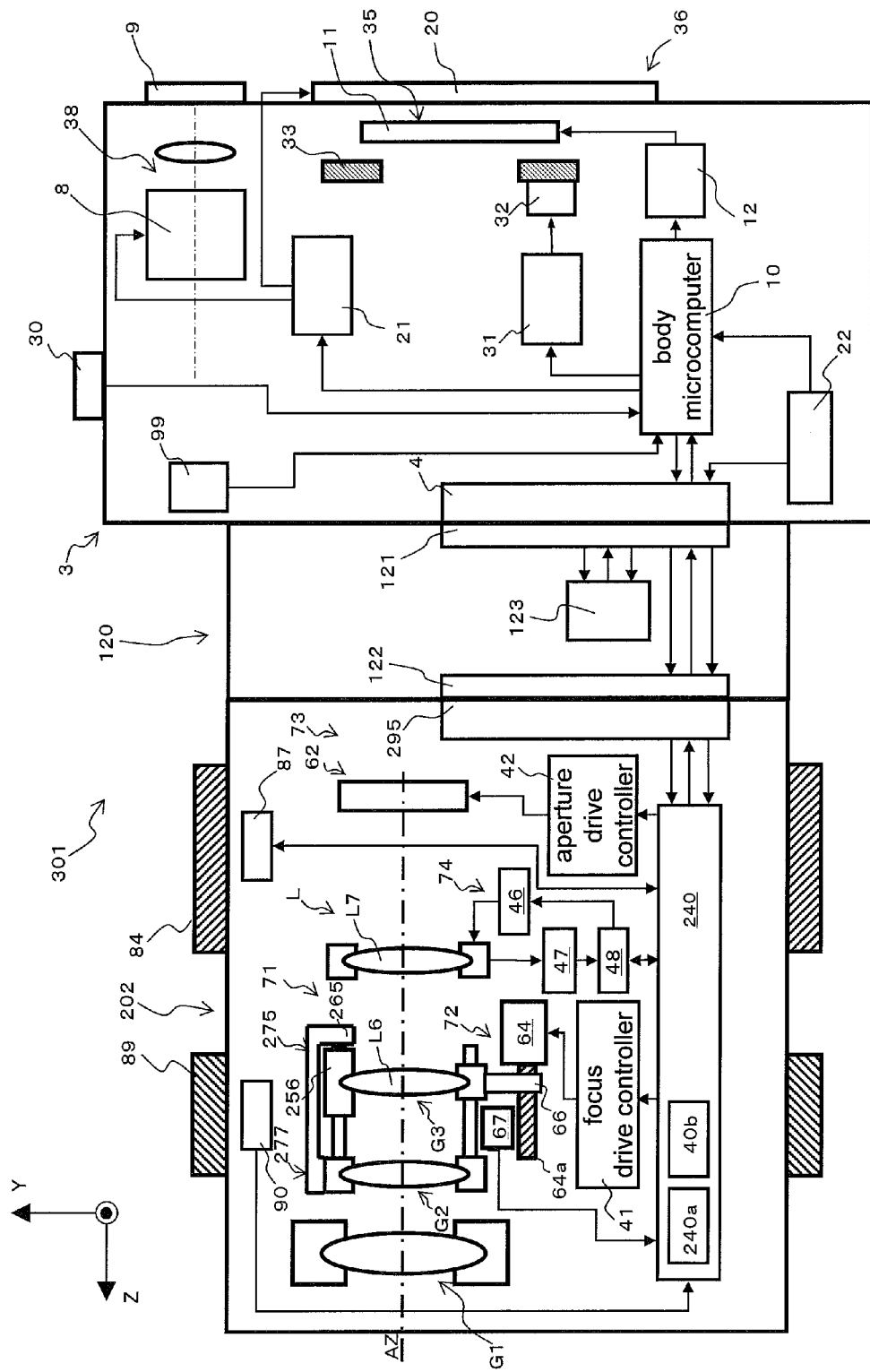
FIG. 19 is a simplified diagram of the configuration of a digital camera.

A digital camera 301 featuring the adapter 120 will now be described through reference to FIG. 19. FIG. 19 is a simplified diagram of the configuration of the digital camera 301. Those components that have substantially the same function as components discussed above will be numbered the same and not described in detail again.

As shown in FIG. 19, the digital camera 301 comprises the camera body 3, the interchangeable lens unit 202, and the adapter 120.

(1) Camera Body

The body microcomputer 10 of the camera body 3 further has a correction determination section 10b. The correction determination section 10b determines whether or not to subject lens operation information to correction processing on the basis of the adapter length, the lens back of the interchangeable lens unit that is mounted, and the flange back Xa of the camera body 3. More specifically, the correction determination section 10b can determine whether or not the standard of an interchangeable lens unit matches the standard of the camera body 3. The "lens operation information" referred to here is information related to the operation of the interchangeable lens unit, and more precisely is information related to the operation of the focus lens. Examples of lens operation information include information related to the position of the focus lens, and information related to the movable range of the focus lens.

The correction determination section 10b computes a determination value V for determining whether or not to subject lens operation information to correction processing from the flange back Xa of the camera body 3, the lens back of the interchangeable lens unit that is mounted, and the adapter length. The determination value V will be discussed below.

Also, information related to the camera body 3 (body information) is held in a memory 10a of the camera body 3. For example, camera ID and the flange back Xa are included in the body information. The correction determination section 10b uses the flange back Xa held in the memory 10a to compute the determination value V or to determine whether or not correction is necessary.

(2) Adapter

The adapter 120 has a first mount 121 (an example of a first mounting portion), a second mount 122 (an example of a second mounting portion), and the adapter microcomputer 123 (an example of a memory section). The first mount 121 is a portion mounted to the body mount 4 of the camera body 3. The first mount 121 and the body mount 4 of the camera body 3 both conform to a first standard. The second mount 122 is a portion mounted to the lens mount 295 of the interchangeable lens unit 202. The second mount 122 and the lens mount 295 of the interchangeable lens unit 202 conform to a second standard. The adapter microcomputer 123 electrically connects to the body microcomputer 10 via the first mount 121 and the body mount 4.

The adapter microcomputer 123 stores information related to the adapter 120 (adapter information). This adapter information includes adapter ID and the adapter length Xs (an example of information related to the adapter length). The adapter length Xs is the length of the adapter 120 in the Z axis direction, and more precisely, as shown in FIG. 18, it is the length along the optical axis AZ from a first mounting face 121a of the first mount 121 (the reference face of the first standard) to a second mounting face 122a of the second mount 122 (the reference face of the second standard).

(3) Interchangeable Lens Unit

The interchangeable lens unit 202 conforms to the second standard, which is different from the standard of the above-mentioned interchangeable lens unit 2, and has a lens back Xb with a different length from that of the interchangeable lens unit 2. Here, the basic configuration of the interchangeable lens unit 202 is substantially the same as the basic configuration of the interchangeable lens unit 2, but differs in that no margin range H is ensured in the movable range of the focus lens unit 275. That is, the interchangeable lens unit 202 is not compatible with contrast AF.

As shown in FIG. 19, the interchangeable lens unit 202 has a second lens group unit 277 (corresponds to the second lens group unit 77), the focus lens unit 275 (corresponds to the focus lens unit 75), the lens mount 295 (corresponds to the lens mount 95), and the lens microcomputer 240 (corresponds to the lens microcomputer 40). The focus lens unit 275 has the third lens group G3 that functions as a focus lens group, and a third lens group support frame 256 that supports the third lens group G3. The focus lens unit 275 is driven by the focus motor 64 in the Z axis direction with respect to the second lens group unit 277. A guide pole 63a that guides the focus lens unit 275 is supported by the guide pole support plate 265 of the second lens group unit 277. The guide pole support plate 265 is disposed on the Z axis direction negative side (the imaging sensor 11 side) of the focus lens unit 275. The movable range of the focus lens unit 275 on the Z axis direction negative side is determined by the guide pole support plate 265.

The lens mount 295 is a portion mounted to the second mount 122. Since the interchangeable lens unit 202 conforms to a different standard from that of the camera body 3, there is the possibility that the lens mount 295 cannot be mounted to the body mount 4, but with the use of the adapter 120 the interchangeable lens unit 202 and the camera body 3 can be connected. The lens microcomputer 240 is electrically connected to the body microcomputer 10 via the lens mount 295, the second mount 122, the first mount 121, and the body mount 4.

A memory 240a of the lens microcomputer 240 holds lens information related to the interchangeable lens unit 202. This lens information includes lens ID, the lens back Xb, the corresponding AF method, and other such information. The lens information also includes a correction coefficient K that is the ratio of the amount of movement of the rear focal position to the amount of movement of the focus lens unit 275. The correction coefficient K is expressed by the following formula (3).

[Mathematical Formula 3]

$$K = X/Y \qquad (3)$$

K: correction coefficient
X: amount of movement of rear focal position (using the imaging sensor 11 as a reference)

Y: amount of movement of focus lens unit 275 (using the focus lens unit 275 as a reference)

For example, the correction coefficient K can be used to compute the amount of movement Y of the focus lens unit 275 from the amount of movement X of the rear focal position. That is, when the rear focal position of the interchangeable lens unit is to be moved with respect to the imaging sensor 11, how much the focus lens unit 275 should be moved with respect to the imaging sensor 11 can be found from the correction coefficient K. In this embodiment, K=1.

Correction of Position Information for Focus Lens Unit

As discussed above, shortening the length of the adapter 120 as in Formula 2 allows an interchangeable lens unit with which no margin range H is ensured to be used.

However, if the length of the adapter 120 is reduced to less than the reference length Xs0, the rear focal position of the interchangeable lens unit 202 ends up being shifted to the Z axis direction negative side. To correct the shift of the rear focal position, the focus lens unit 275 must be moved to the Z axis direction positive side. Accordingly, the relation between the subject distance and the position of the focus lens unit 275 within the interchangeable lens unit 202 must be corrected using the above-mentioned correction coefficient K.

Figure 20:
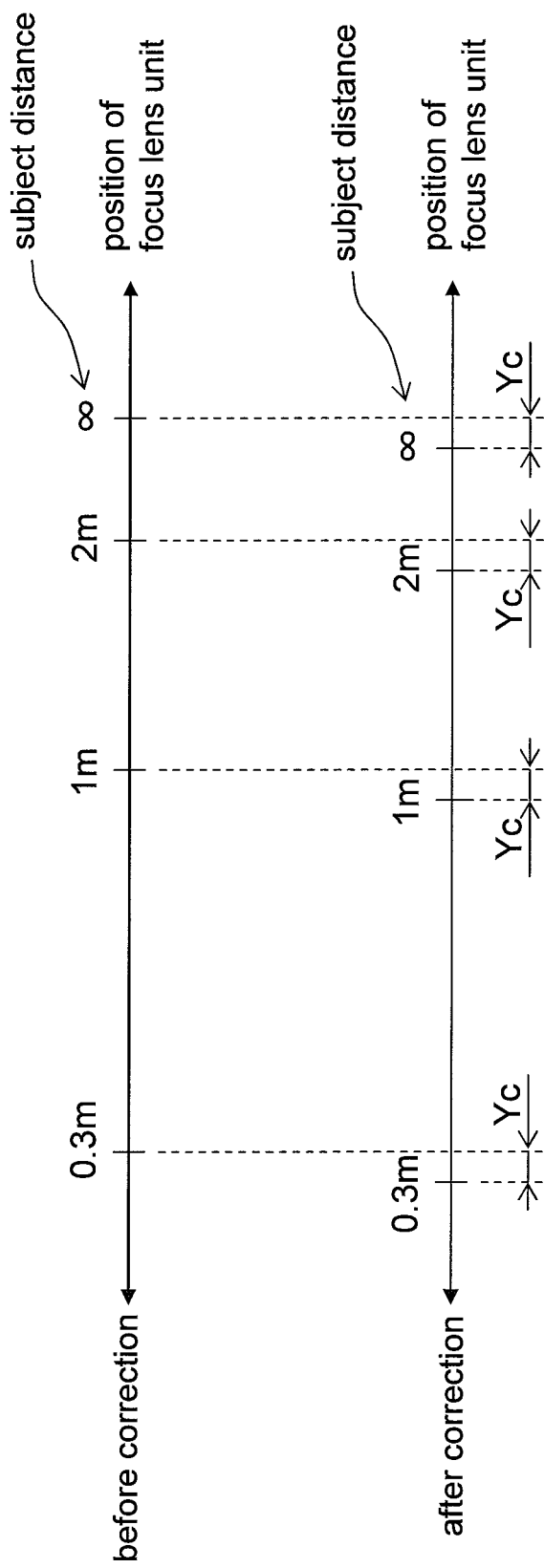
FIG. 20 is a diagram illustrating the correction processing of position information.

In view of this, as shown in FIG. 20, with the interchangeable lens unit 202, the position information for the focus lens unit 275 is electrically corrected so that each of the position of the focus lens unit 275 with respect to the second lens group unit 277 at subject distances of 0.3 m, 1.0 m, and infinity ($\infty$) is shifted to the subjected side by a correction amount Yc. This correction processing could also be called processing in which position information for the focus lens unit 275 is converted into correction position information. The correction amount Yc is the amount of movement of the focus lens unit 275 needed to move the rear focal position by a distance of Xc to the Z axis direction positive side, and is computed by the lens microcomputer 240 according to the following formula (4). In the computation of the correction amount Yc, the lens microcomputer 240 acquires the distance Xc from the body microcomputer 10, for example. The computed correction amount Yc is stored in the memory 240a, for example. The computation of the correction amount Yc may also be performed by the body microcomputer 10.

[Mathematical Formula 4]

$$Yc = Xc/K \quad (4)$$

For instance, in manual focus imaging mode, the focus lens unit 275 is driven according to the angle at which the focus ring 89 is operated. More specifically, the lens microcomputer 240 computes the target position of the focus lens unit 275 from the rotational angle of the focus ring 89 detected by the focus ring angle detector 90. This "target position" refers to the target position of the focus lens unit 275 with respect to the second lens group unit 277. The lens microcomputer 240 sends the focus drive controller 41 a control signal corresponding to the target position of the focus lens unit 275, and the focus drive controller 41 sends the focus motor 64 a drive signal corresponding to this control signal. A corrector 240c of the lens microcomputer 240 performs correction processing on the target position of the focus lens unit 275 so that the target position of the focus lens unit 275 will be shifted by the correction amount Yc to the Z axis direction positive side (the subject side). This correction processing will be discussed in detail below. Consequently, even though the adapter length Xs is shorter than the reference length Xs0, the position information about the focus lens unit 275 can be corrected so that the focus lens unit 275 is disposed at the optically correct position.

Also, in the case of electronic tracking, when the lens microcomputer 240 finds the subject distance from the rotational position of the zoom ring 84 and the position of the focus lens unit 275 with respect to the second lens group unit 277 on the basis of the tracking table 100, the position information for the focus lens unit 275 is corrected by the corrector 240c so that the current position of the focus lens unit 275 will be shifted by the correction amount Yc to the Z axis direction positive side.

Figure 21:
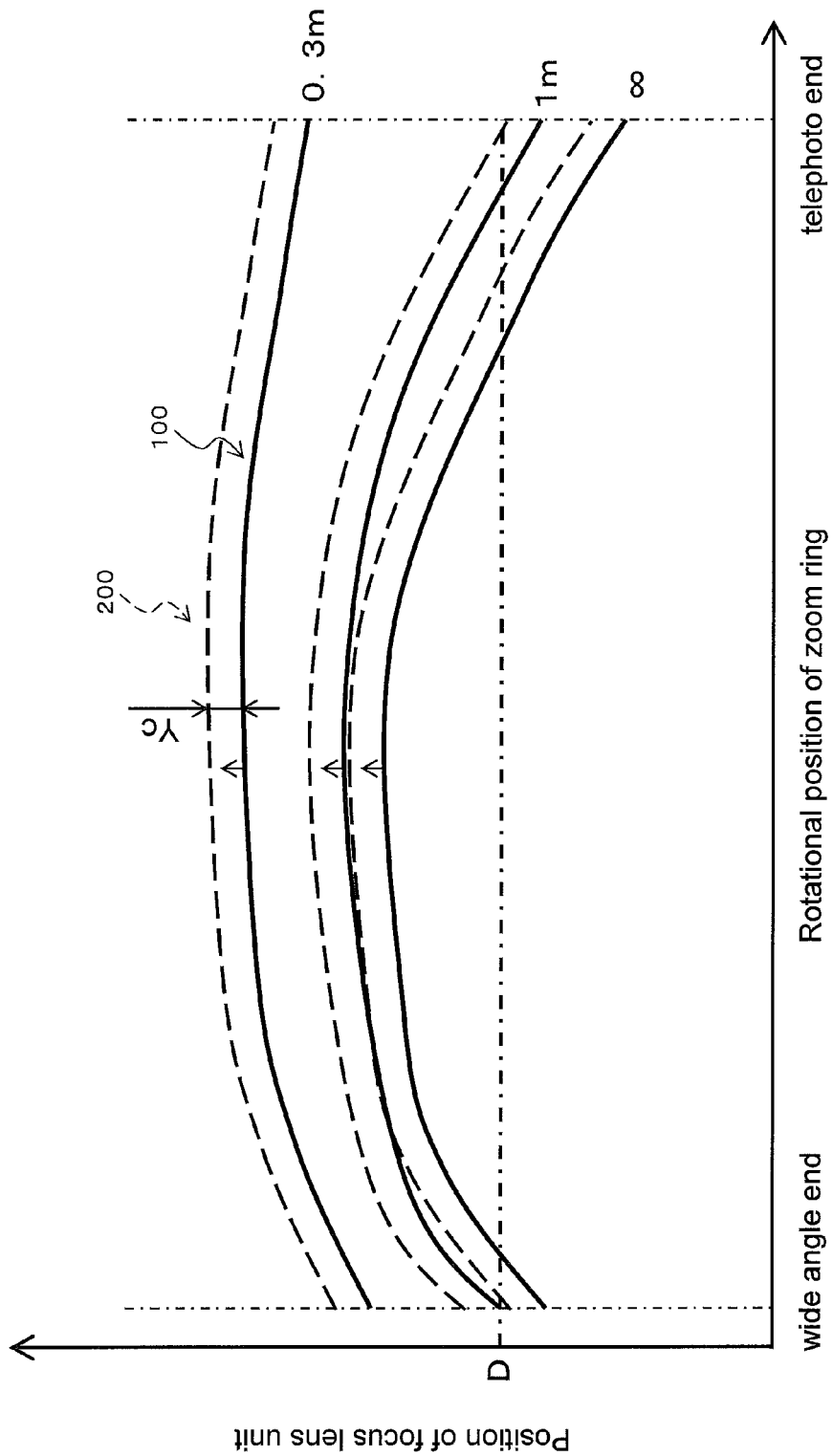
FIG. 21 is a diagram illustrating the correction processing of a tracking table.

Also, when the lens microcomputer 240 computes the target position of the focus lens unit 275 from the rotational position of the zoom ring 84 on the basis of the tracking table 100, the position information for the focus lens unit 275 is corrected by the corrector 240c so that the target position of the focus lens unit 275 found from the tracking table 100 shown in FIG. 14 will be shifted by the correction amount Yc to the Z axis direction positive side. When this correction processing is expressed as a tracking table, as shown in FIG. 21, the tracking table 100 is shifted to the subject side (upward in FIG. 21), and becomes the tracking table 200.

If the interchangeable lens unit 202 thus has an electronic tracking function, a decrease in electronic tracking accuracy can be prevented. Also, in manual focus imaging mode it is possible to prevent a discrepancy between the indicated value on the focus ring 89 and the actual focus state.

When the subject distance is computed from position information about the focus lens unit 275, the position information about the focus lens unit 275 is corrected by the corrector 240c so that the position of the focus lens unit 275 corresponding to the focal distance will be shifted by the correction amount Yc to the Z axis direction positive side (the subject side). In this case, for example, the subject distance is computed on the basis of the corrected tracking table 200 and the position information for the focus lens unit 275.

Correction of Movable range of Focus Lens Unit (1) With an Interchangeable Lens Unit that is Not Compatible with Contrast AF When the adapter 120 is used, there will also be cases in which the range of movement of the focus lens unit 275 must be limited. Here, we will describe a case in which the interchangeable lens unit is not compatible with contrast AF.

In manual focus imaging mode, when the user operates the focus ring 89, the focus lens unit 275 is driven by the focus motor 64 by a distance corresponding to the rotational angle of the focus ring 89. If the movement range here is not limited, there is the risk that the focus lens unit 275 will move outside the range determined by the optical design.

Figure 22:
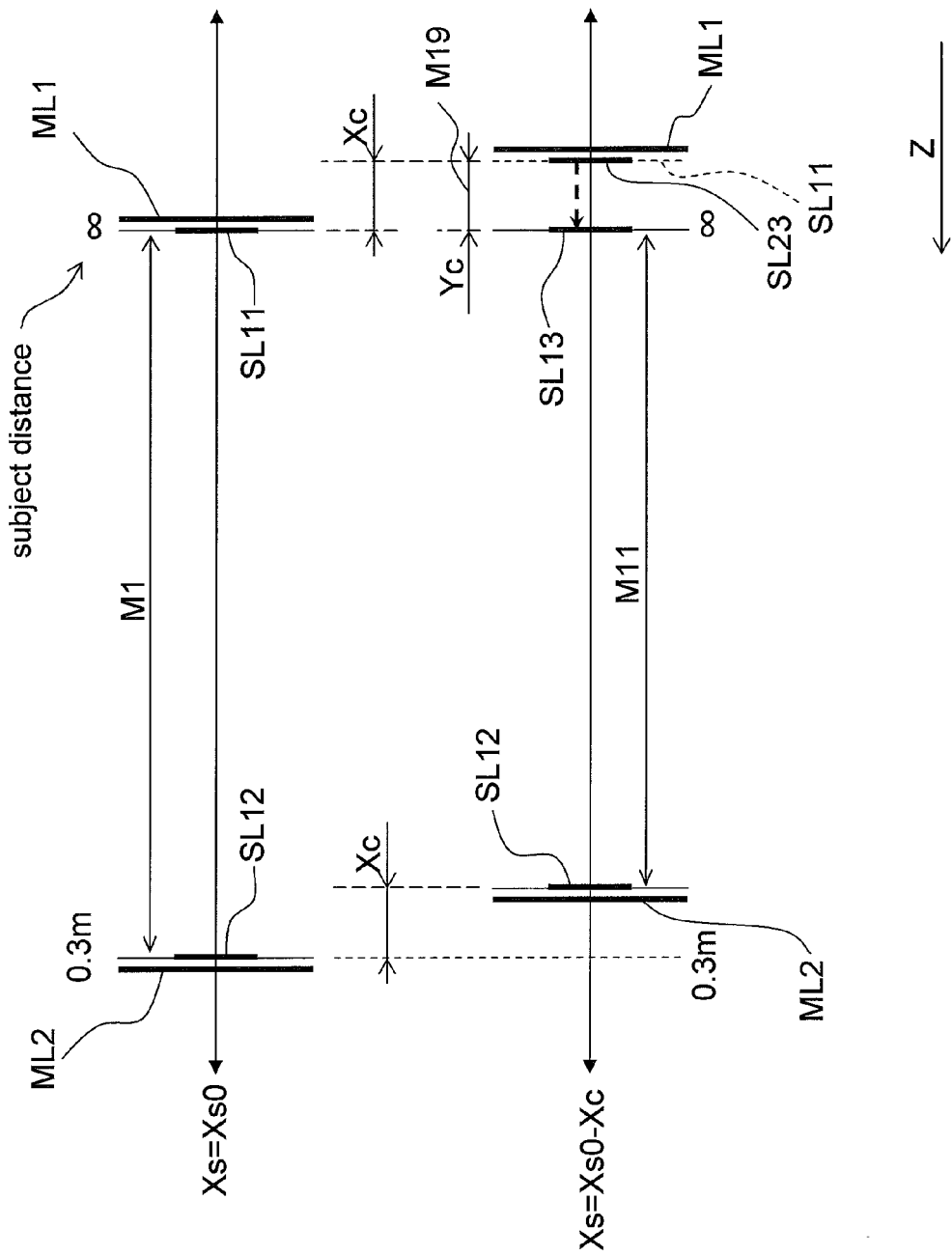
FIG. 22 is a diagram illustrating the correction processing of a movable range.

For example, with an interchangeable lens unit that is not compatible with contrast AF, as shown in FIG. 22, a movement range M1 is determined by limit positions SL11 and SL12. These limit positions SL11 and SL12 are positions at which the movement of the focus lens unit 275 is electrically limited. More specifically, when the interchangeable lens unit 202 is used with the camera body 203, which conforms to the same second standard as the interchangeable lens unit 202, the limit position SL11 is the position of the focus lens unit 275 in the infinity focal state, and the limit position SL12 is the position of the focus lens unit 275 in the closest focal state. That is, these limit positions SL11 and SL12 are the positions at both ends of the focal range of the focus lens unit 275 when the interchangeable lens unit 202 is used with the camera body 203 that conforms to the same second standard. With a conventional interchangeable lens unit, it is common for the electrical limit positions thus to be both ends of the focal range used during focal adjustment.

Furthermore, there are limit positions ML1 and ML2, at which the movement of the focus lens unit 275 is mechanically limited, on the outside of the movement range M1. For example, with the interchangeable lens unit 202, the position where the focus lens unit 275 comes into contact with the guide pole support plate 265 corresponds to the limit position ML1. The electrical limit positions SL11 and SL12 are disposed to the inside of the limit positions ML1 and ML2 so that the focus lens unit 275 will not come into contact with the members that determine the limit positions ML1 and ML2, and cause problems.

When an interchangeable lens unit having this movement range M1 is mounted to the camera body 3 via the adapter 120, the limit positions are shifted by the distance Xc to the camera body 3 side (the right side in FIG. 22) with respect to the imaging sensor 11. As a result, on the infinity side, the limit position SL11 is disposed to the outside (the imaging sensor 11 side) of the position (cc) at which the focus is at infinity, and the focus lens unit 275 is able to move over a range M19 outside of the range determined by optical design. Therefore, if the focus ring 89 is moved until the focus lens unit 275 stops at the electrical limit position SL11, it is possible that the user will incorrectly think the focus is at infinity, and will capture an image in a state in which the focus lens unit 275 is disposed in this range M19. Since the range M19 is a range not foreseen in optical design, using this range M19 can result in a decrease in optical characteristics.

Figure 23:
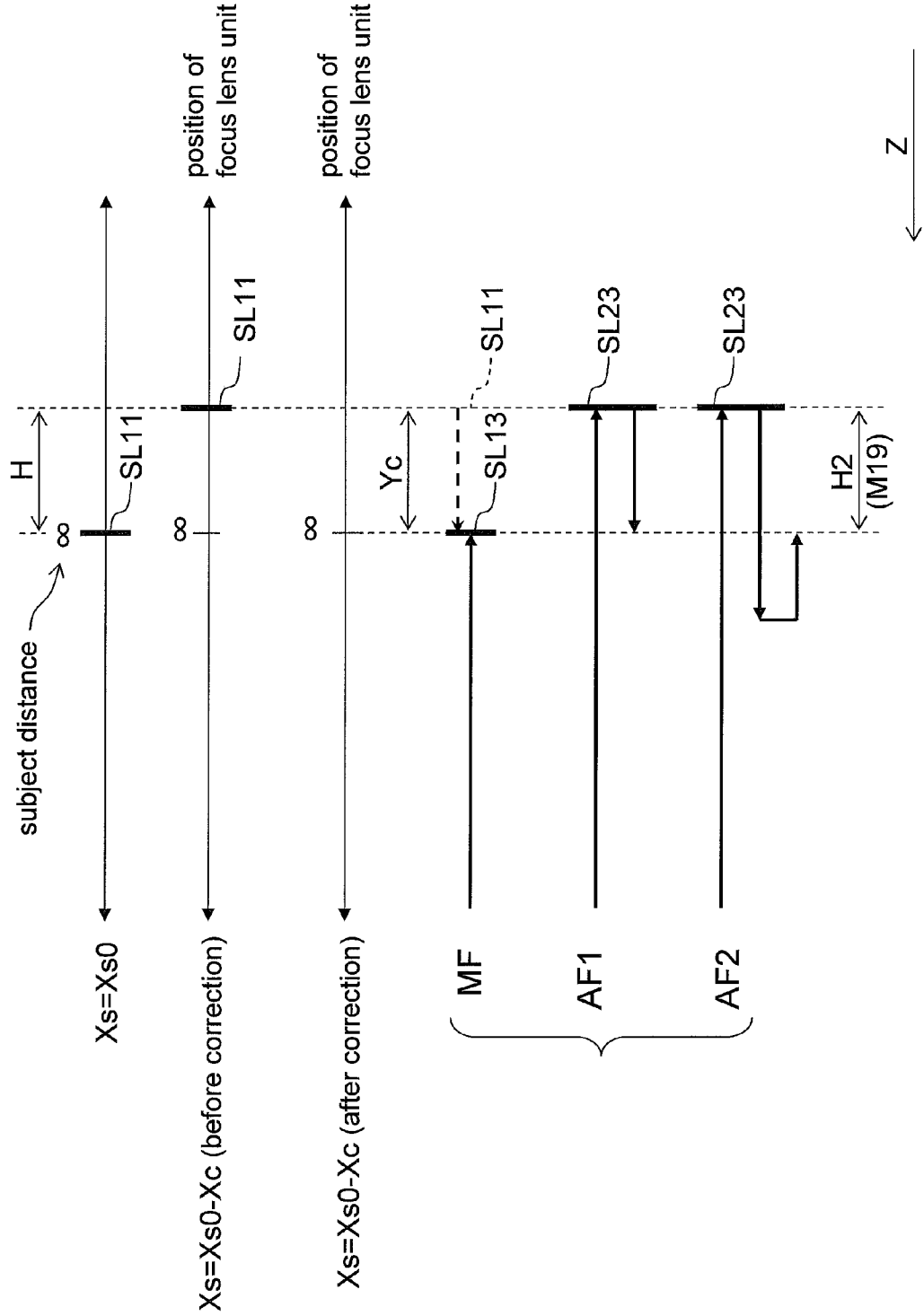
FIG. 23 is a diagram illustrating the correction processing of a movable range.

In view of this, as shown in FIGS. 22 and 23, in manual focus imaging mode, the corrector 240c corrects the movement range M1 to the movement range M11. More specifically, as indicated by "MF" in FIG. 23, the corrector 240c corrects the limit position SL11 to the limit position SL13. The limit position SL13 within the interchangeable lens unit 202 is shifted by Yc to the Z axis direction positive side beyond the limit position SL11. In this case, as shown in FIG. 22, the corrector 240c does not correct the limit position SL12 on the near side.

When the movement range (limit position) of the focus lens unit 275 is thus corrected, even if the user turns the focus ring 89 by a large amount in manual focus imaging mode, the focus lens unit 275 will be stopped at the electrical limit position SL13, and the movement range of the focus lens unit 275 will stay within the range determined by optical design (here, the movement range M1).

Also, in auto focus imaging mode, the corrector 240c sets the limit position SL11 to a new limit position SL23. More specifically, as indicated by "AF1" and "AF2" in FIG. 23, the limit position SL11 is set to the new limit position SL23 by the corrector 240c of the lens microcomputer 240. Thus, a range from the infinity position of the focus lens to the limit position SL23 is ensured as the margin range H. The limit position SL11 may also be used directly as the limit position SL23.

For example, when the focus is at infinity, as indicated by "AF1," the focus lens unit 275 is driven to the Z axis direction negative side (the right side in FIG. 23), passes the focal position (the infinity position in this case), and then stops at the limit position SL23. As a result, the maximum AF evaluation value can be detected. After this, the focus lens unit 275 is driven by the focus motor 64 to the Z axis direction positive side (the left side in FIG. 23) up to the position at which the AF evaluation value reaches its maximum, and the focus lens unit 275 stops at the focal position.

When there is a large backlash between the lead screw 64a and the rack 66, as indicated by "AF2," the reversal of the focus lens unit 275 is repeated twice. More specifically, the focus lens unit 275 passes the focal position (the infinity position in this case), and then stops at the limit position SL23. After this, the focus lens unit 275 is driven by the focus motor 64 to the Z axis direction positive side (the left side in FIG. 23), and again passes the focal position. After this, the focus lens unit 275 is driven to the Z axis direction negative side, and stops at the focal position. Consequently, compared to the operation indicated by "AF1," the effect of backlash is reduced, and the focus lens unit 275 can be stopped at the focal position more accurately.

If the corrector 240c is not provided to the lens microcomputer 240 from the outset, then this function can be added to the lens microcomputer 240 through a firmware update, for example. If an interchangeable lens unit with which a firmware update is possible has been mounted, a message or graphic recommending a firmware update may be displayed on the display unit 20 of the camera body 3.

Thus, since the lens microcomputer 240 subjects the movement range M1 of the focus lens unit 275 to correction processing, imaging will not be performed with the focus lens unit 275 stopped in the range M19 outside of the range set by optical design. Also, even if there is no margin range H for contrast AF, a margin range H1 corresponding to the correction amount Yc can be ensured on the infinity side, and the interchangeable lens unit can be made compatible with contrast AF.

(2) With Interchangeable Lens Unit that is Compatible with Contrast AF

Correction of the movement range is also carried out by the corrector 240c when an interchangeable lens unit that conforms to the second standard is compatible with contrast AF.

Figure 24:
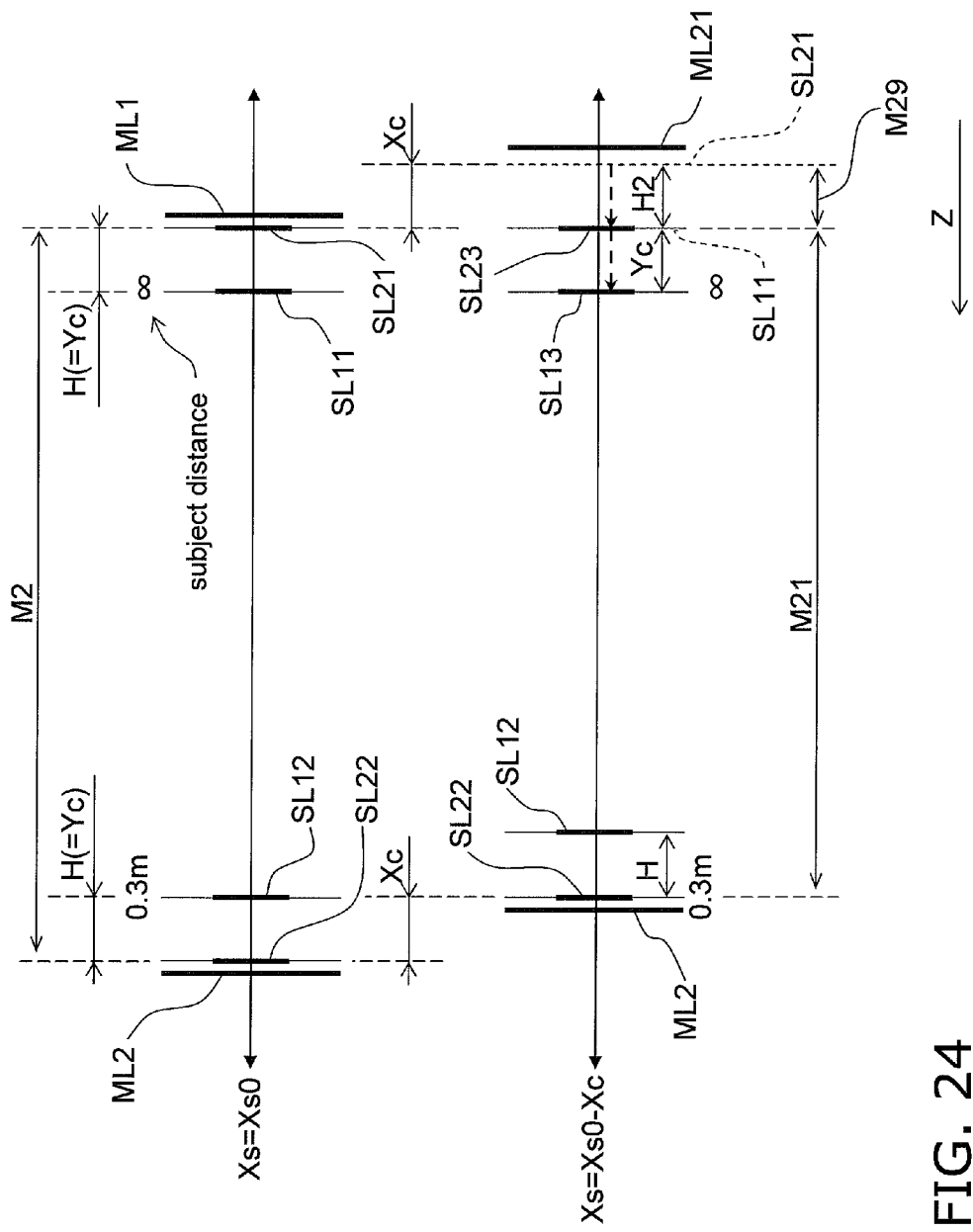
FIG. 24 is a diagram illustrating the correction processing of a movable range.
Figure 25:
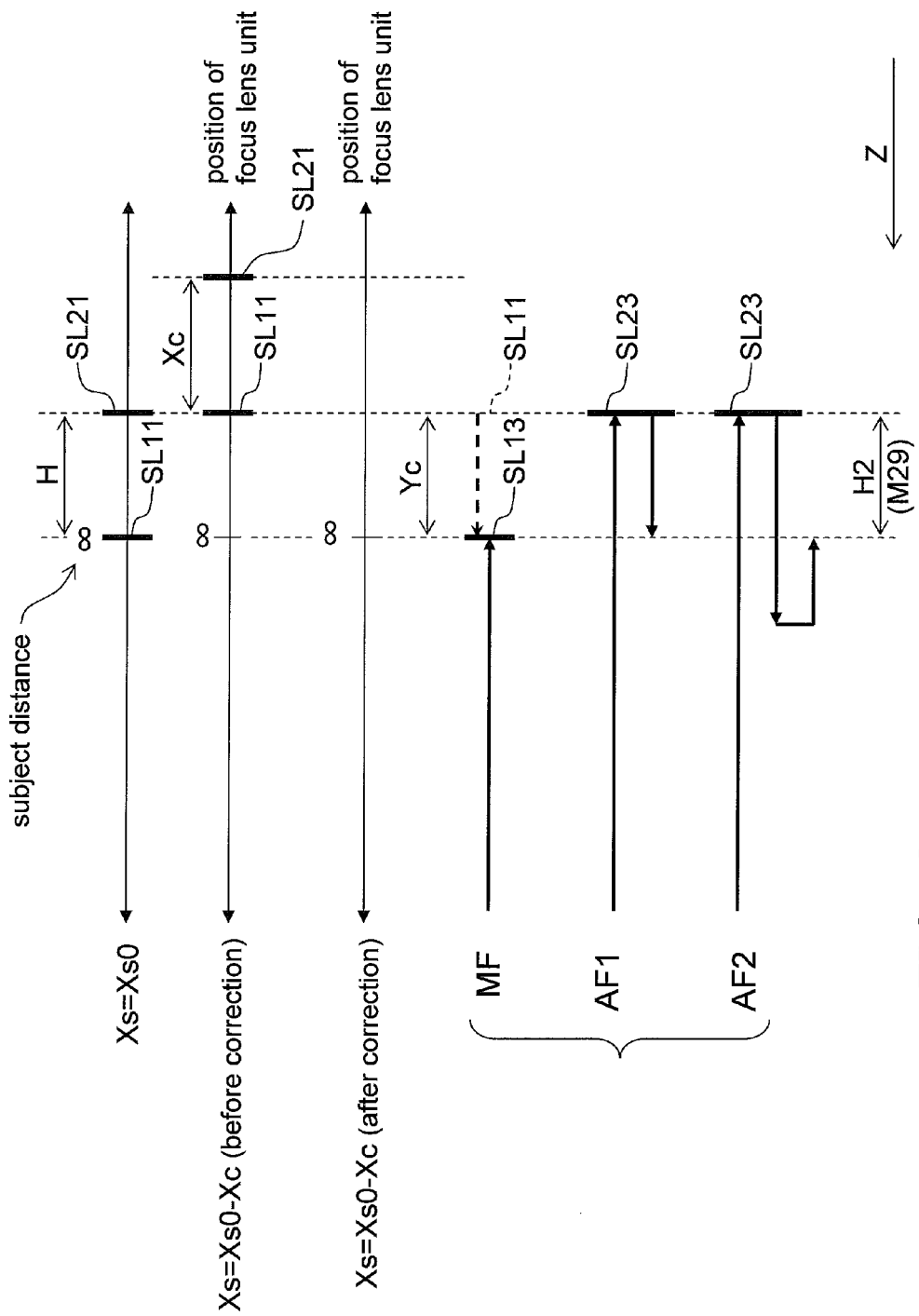
FIG. 25 is a diagram illustrating the correction processing of a movable range.

More specifically, as shown in FIGS. 24 and 25, the movement range M2 in this case is determined by limit positions SL21 and SL22. These limit positions SL21 and SL22 are the positions at which movement of the focus lens unit 275 is electrically limited. Outside of this movement range M2, there are limit positions ML1 and ML2 at which the movement of the focus lens unit 275 is mechanically limited.

Furthermore, the margin range H is provided at both ends of the movement range M2 in order to be compatible with contrast AF. The margin range H is determined by the limit positions SL11 and SL12. The limit positions SL11 and SL12 are located to the inside of the movement range M2. The limit position SL11 is disposed at a position corresponding to infinity, and the limit position SL12 is disposed at a position corresponding to a close-up (0.3 m). These limit positions SL11 and SL12 are the end positions of the focal range of the focus lens unit 275 when using the camera body 203 that conforms to the same second standard as the interchangeable lens unit. Also, in manual focus imaging mode, the range over which the focus lens unit 275 can be moved by operation of the focus ring 89 is electrically limited by the limit positions SL11 and SL12.

When an interchangeable lens unit having this movement range M2 is mounted to the camera body 3 via the adapter 120, the limit positions are shifted to the camera body 3 side (the right side in FIG. 24) by the distance Xc. Meanwhile, as a result of the above-mentioned correction processing, the position ($\infty$) at which the focus is at infinity is shifted by the correction amount Yc to the Z axis direction positive side (the left side in FIG. 24) within the interchangeable lens unit. As a result, on the infinity side, the limit position SL11 is disposed to the outside (the imaging sensor 11 side) of the position ($\infty$) at which the focus is at infinity, and in manual focus imaging mode, the focus lens unit 275 is able to move over a range M29 outside of the range determined by optical design. Therefore, if the focus ring 89 is moved until the focus lens unit 275 stops at the electrical limit position SL11, it is possible that the user will incorrectly think the focus is at infinity, and will capture an image in a state in which the focus lens unit 275 is disposed in this range M29. Since the range M29 is a range not foreseen in optical design, using this range M29 can result in a decrease in optical characteristics.

In view of this, as shown in FIGS. 24 and 25, in manual focus imaging mode, the corrector 240c corrects the movement range M2 to the movement range M21. More specifically, as indicated by "MF" in FIG. 25, the corrector 240c corrects the limit position SL11 to the limit position SL13, which is shifted by Yc to the Z axis direction positive side. In this case, as shown in FIG. 24, the corrector 240c does not correct the limit position SL12 on the near side.

When the movement range (limit position) of the focus lens unit 275 is thus corrected, even if the user turns the focus ring 89 by a large amount in manual focus imaging mode, the focus lens unit 275 will be stopped at the electrical limit position SL13. Consequently, the movement range of the focus lens unit 275 will stay within the range determined by optical design.

Also, the corrector 240c corrects the limit position SL21 so that the limit position SL21 is shifted by the correction amount Yc to the Z axis direction positive side. More specifically, as indicated by "AF1" and "AF2" in FIG. 25, the limit position SL21 is corrected to the limit position SL23 by the corrector 240c of the lens microcomputer 240. In this case, as shown in FIG. 24, the corrector 240c does not correct the limit position SL22 on the near side. Thus, a margin range H2 that corresponds to the correction amount Yc is ensured outside of the focal range in which the camera is in focus.

For example, when the focus is at infinity, as indicated by "AF1," the focus lens unit 275 is driven to the Z axis direction negative side (the right side in FIG. 24), passes the focal position (the infinity position in this case), and then stops at the limit position SL23. As a result, the maximum AF evaluation value can be detected. After this, the focus lens unit 275 is driven by the focus motor 64 to the Z axis direction positive side (the left side in FIG. 24) up to the position at which the AF evaluation value reaches its maximum, and the focus lens unit 275 stops at the focal position.

When there is a large backlash between the lead screw 64a and the rack 66, as indicated by "AF2," the reversal of the focus lens unit 275 is repeated twice. More specifically, the focus lens unit 275 passes the focal position (the infinity position in this case), and then stops at the limit position SL23. After this, the focus lens unit 275 is driven by the focus motor 64 to the Z axis direction positive side (the left side in FIG. 25), and again passes the focal position. After this, the focus lens unit 275 is driven to the Z axis direction negative side (the right side in FIG. 25), and stops at the focal position. Consequently, compared to the operation indicated by "AF1," the effect of backlash is reduced, and the focus lens unit 275 can be stopped at the focal position more accurately.

If the corrector 240c is not provided to the lens microcomputer 240 from the outset, then this function can be added to the lens microcomputer 240 through a firmware update, for example.

Thus, since the lens microcomputer 240 subjects the movement range M2 of the focus lens unit 275 to correction processing, the focus lens unit 275 will never move through the range M29 outside of the range set by optical design. Also, the margin range H2 for contrast AF can be maintained at a suitable distance, and a decrease in the contrast AF speed can be prevented.

Operation of the Digital Camera

The operation of the digital camera 301 will be described.

(1) Imaging Mode

This digital camera 301 has two imaging modes. More specifically, the digital camera 301 has a viewfinder imaging mode in which the user looks through the viewfinder eyepiece window 9 to view the subject, and a monitor imaging mode in which the user observes the subject on the display unit 20.

In viewfinder imaging mode, the image display controller 21 drives the liquid crystal viewfinder 8, for example. As a result, an image of the subject (a so-called through-image) acquired by the imaging sensor 11 is displayed on the liquid crystal viewfinder 8.

In monitor imaging mode, the display unit 20 is driven by the image display controller 21, for example, and a real-time image of the subject is displayed on the display unit 20. Switching between these two imaging modes can be performed with the imaging mode selector button 34.

(2) Correction During Lens Mounting

The camera body 3 determines whether or not lens operation information needs to be corrected, according to the interchangeable lens unit and adapter that are mounted. To this end, correction necessity determination and correction processing are performed when the interchangeable lens unit is mounted.

Figure 26:
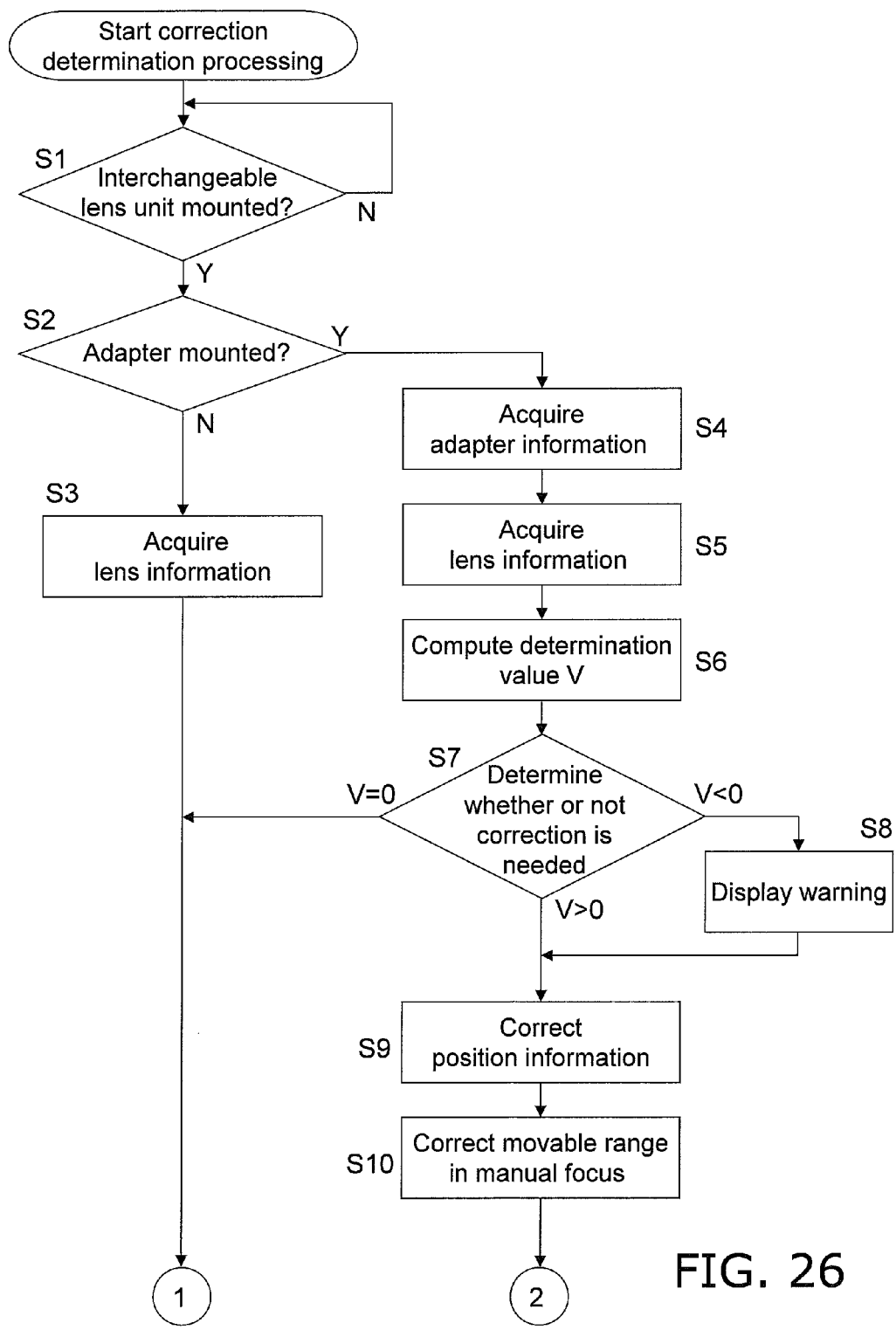
FIG. 26 is a flowchart of correction determination processing.

More specifically, as shown in FIG. 26, whether or not an interchangeable lens unit has been mounted is confirmed by the body microcomputer 10 (S1). More specifically, a contact for detecting an interchangeable lens unit is provided to the body mount 4, and the body microcomputer 10 utilizes this contact to detect whether or not an interchangeable lens unit has been mounted. If no interchangeable lens unit has been mounted, the body microcomputer 10 continues to monitor for the mounting of an interchangeable lens unit. We will assume here that the interchangeable lens unit 202 has been mounted.

On the other hand, if the mounting of an interchangeable lens unit is detected, then the body microcomputer 10 confirms whether or not an adapter has been mounted (S2). A contact for detecting the adapter 120 is provided to the body mount 4, and the body microcomputer 10 utilizes this contact to detect whether or not the adapter 120 has been mounted. We will assume here that the adapter 120 has been mounted. If no adapter has been mounted, the body microcomputer 10 acquires lens information from the lens microcomputer 240 of the interchangeable lens unit 202 (S3). This lens information includes lens ID, the lens back Xb, the corresponding AF method, and other such information.

Figure 27:
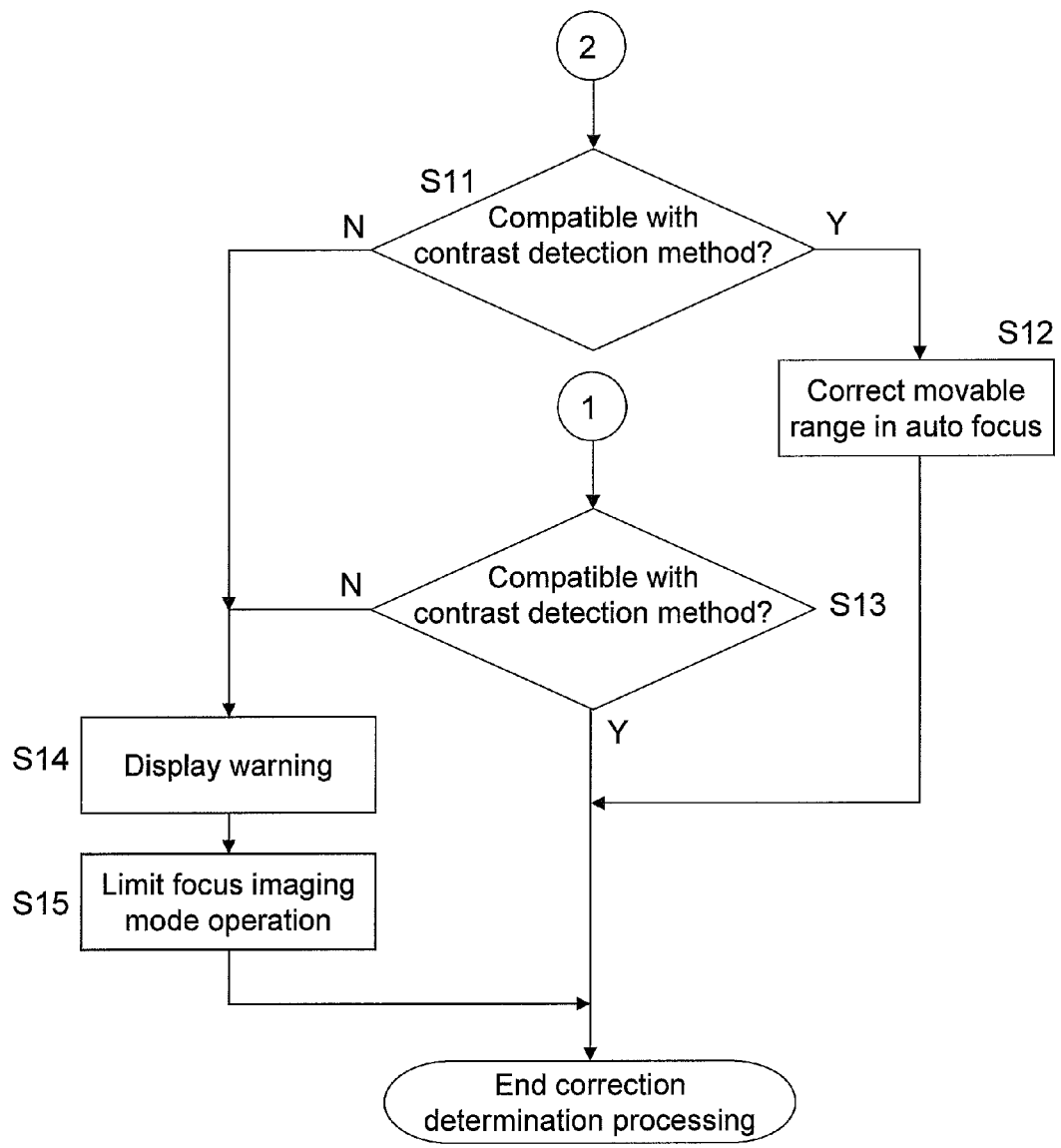
FIG. 27 is a flowchart of correction determination processing.

After step S3, as shown in FIG. 27, the body microcomputer 10 determines whether or not the interchangeable lens unit is compatible with a contrast detection method on the basis of this lens information (S13). If the mounted interchangeable lens unit is compatible with contrast detection, the correction determination processing is ended. If, on the other hand, the interchangeable lens unit is not compatible with contrast detection, a warning to this effect is displayed on the display unit 20 (S14), and operation of the focus imaging mode is limited (S15). More specifically, the focus imaging mode is fixed at the manual focus mode by the body microcomputer 10 regardless of the mode selected with the focus imaging mode button (not shown). After this, correction determination processing is ended.

When the adapter 120 is mounted to the camera body 3, and the interchangeable lens unit 202 is mounted to the adapter 120, adapter information is acquired from the adapter microcomputer 123 of the adapter 120 by the body microcomputer 10 (S4). This adapter information includes, for example, adapter ID, the adapter length Xs, and other such information. Then, just as in step S3, lens information is acquired from the lens microcomputer 240 of the interchangeable lens unit 202 by the body microcomputer 10 (S5). This lens information includes the lens back Xb, and information indicating that the interchangeable lens unit 202 is not compatible with a contrast detection method.

After acquisition of the lens information, the correction determination section 10b of the body microcomputer 10 computes the determination value V indicated by the following formula (5) (S6).

[Mathematical Formula 5]

$$V = Xb - Xa - Xs = Xs0 - Xs \qquad (5)$$

After computation of the determination value V, the correction determination section 10b determines whether or not to perform correction processing on the lens operation information (S7). More specifically, it is determined whether or not the length of the mounted adapter is shorter than the reference length Xs0, on the basis of the computed determination value V. For example, if the determination value V=0, then the adapter length Xs is equal to the reference length Xs0, so the lens operation information is not subjected to correction processing.

On the other hand, if the determination value V is greater than 0, then the adapter length Xs of the adapter 120 is shorter than the reference length Xs0, so the interchangeable lens unit 202 is disposed closer to the camera body 3 than when the adapter length is equal to the reference length Xs0. In this case, the position information for the focus lens unit 275 is subjected to correction processing as discussed above. More specifically, as shown in FIG. 20, a position correction command is sent along with the determination value V from a correction command section 10d (see FIG. 2) of the body microcomputer 10 to the corrector 240c of the lens microcomputer 240. The lens microcomputer 240 performs correction processing on the position information so that the target position of the focus lens unit 275 during operation is shifted by the determination value V in the Z axis direction, on the basis of this position correction command and the determination value V. If the determination value V is greater than 0, the position information is corrected so that the target position is shifted to the Z axis direction positive side (the subject side). If the determination value V is less than 0, the position information is corrected so that the target position is shifted to the Z axis direction negative side (the imaging sensor 11 side). In this embodiment, since the interchangeable lens unit 202 is mounted, the determination value V is greater than 0, and correction of the position information is performed by the corrector 240c as shown in FIG. 20.

After correction of the position information, correction processing is performed on the movement range M1 or the movement range M2 of the focus lens unit 275 in manual focus imaging mode (S10). More specifically, a limit correction command is sent along with the determination value V from the body microcomputer 10 to the lens microcomputer 240. This limit correction command and the determination value V cause the lens microcomputer 240 to perform correction processing on the limit position SL11 so that the limit position SL11 is shifted by the determination value V in the Z axis direction. If the determination value V is greater than 0, the limit position SL11 is corrected so that the limit position SL11 is shifted to the Z axis direction positive side (the subject side). If the determination value V is less than 0, the limit position SL11 is corrected so that the limit position SL11 is shifted to the Z axis direction negative side (the imaging sensor 11 side). In this embodiment, as shown in FIG. 22 or 24, the limit position SL11 is corrected to the limit position SL13. Also, as shown in FIG. 22 or 24, a new limit position SL23 is set instead of the limit position SL11 prior to correction.

After correction of the movement range, as shown in FIG. 27, the body microcomputer 10 determines on the basis of the lens information whether or not the interchangeable lens unit 202 is compatible with contrast detection (S11). If the interchangeable lens unit 202 is compatible with contrast detection, then as shown in FIG. 24, for example, correction processing is performed on the movement range M2 of the focus lens unit 275 in auto focus imaging mode (S12). For example, if a firmware update has made the interchangeable lens unit 202 compatible with contrast detection, then the movement range M2 is also corrected in the interchangeable lens unit 202. More specifically, a limit correction command is sent along with the determination value V from the body microcomputer 10 to the lens microcomputer 240. This limit correction command and the determination value V cause the limit position SL21 to be corrected. More precisely, the limit position SL21 is subjected to correction processing by the lens microcomputer 240 so that the limit position SL21 is shifted by the determination value V in the Z axis direction. If the determination value V is greater than 0, then the limit position SL21 is corrected so that the limit position SL21 is shifted to the Z axis direction positive side (the subject side). If the determination value V is less than 0, then the limit position SL21 is corrected so that the limit position SL21 is shifted to the Z axis direction negative side (the imaging sensor 11 side). In this embodiment, as shown in FIG. 24, the limit position SL21 is corrected to the limit position SL23 by the corrector 240c. After correction, the correction determination processing is ended.

On the other hand, if the interchangeable lens unit is not compatible with contrast detection, then a warning is displayed on the display unit 20 as discussed above (S14), and operation in focus imaging mode is limited (S15). After this, the correction determination processing is ended.

Thus, with this camera body 3, it is determined whether or not to subject the lens operation information to correction processing on the basis of the lens information and adapter information, and correction processing is performed on the lens operation information as needed. Consequently, compatibility with more interchangeable lens units can be ensured with this camera body 3.

If the interchangeable lens unit 202 is removed from the adapter 120, the corrected lens operation information returns to the state prior to correction. At this point, the corrected lens operation information is either temporarily stored in the non-volatile memory of the lens microcomputer 240, or the lens operation information is corrected in real time.

(3) Zoom Operation

Next, the operation of the interchangeable lens unit 2 when the user performs zooming will be described.

When the user rotates the zoom ring 84, the cam barrel 51 rotates along with the zoom ring 84. When the cam barrel 51 rotates around the optical axis AZ, the first holder 52 is guided by the first cam grooves 51d of the cam barrel 51, and advances in the Z axis direction. The second holder 55 and the fourth lens group support frame 61 are also guided by the second cam grooves 51b and the third cam grooves 51c of the cam barrel 51, and advance in the Z axis direction. Thus, by rotating the zoom ring 84, the state of the interchangeable lens unit 2 can be changed from the wide angle end state shown in FIGS. 5 and 6 to the telephoto end state shown in FIGS. 7 and 8. Consequently, the subject can be imaged at the desired zoom position by adjusting the rotational position of the zoom ring 84.

The second holder 55 is mechanically driven in the Z axis direction by rotating the zoom ring 84 here, but only the focus lens unit 275 is electrically driven and controlled by the focus adjusting unit 72 on the basis of the tracking table 100 stored ahead of time in the memory 240a, so that the subject distance remains substantially constant. For example, when the focus lens unit 275 is driven by the focus motor 64 on the basis of the tracking table 100, the focal state is kept at infinity both when the move is from the wide angle end to the telephoto end, and when the move is from the telephoto end to the wide angle end. Here, since the adapter 120 is used, which has an adapter length Xs that is shorter than the reference length Xs0, the position information for the focus lens unit 275 is corrected by the corrector 240c, as discussed above. Accordingly, drive of the focus lens unit 275 is carried out on the basis of the corrected position information. Essentially, electronic tracking is performed on the basis of the tracking table 200 shown in FIG. 21.

For example, when the zoom ring 84 is turned, the first lens group G1, the second lens group G2, the third lens group G3, and the fourth lens group G4 move in the Z axis direction along the optical axis AZ. Consequently, the magnification of the subject image changes. At this point the third lens group G3 also moves in the Z axis direction along the optical axis AZ in a state of being supported by the second holder 55 via the third lens group support frame 56. When there is a relative change in the positional relation between the first lens group G1, the second lens group G2, the third lens group G3, and the fourth lens group G4, the focal state of the subject image formed on the imaging sensor 11 also changes. That is, the subject distance at which the focal point is formed on the imaging sensor 11 changes.

In view of this, with the digital camera 301, even if the focal distance changes, the subject distance can be kept substantially constant by driving the focus motor 64 according to the rotational position of the zoom ring 84. More specifically, using just the focus motor 64, the focus lens unit 275 including the third lens group G3 is driven with respect to the second lens group unit 277. The lens microcomputer 240 acquires the rotational position of the zoom ring 84 on the basis of the detection signal of the linear position sensor 87. At the same time, the lens microcomputer 240 computes the position of the focus lens unit 275 with respect to the second lens group unit 277 from the count value at the counter 40b. Utilizing the plurality of tracking tables 100 shown in FIG. 14, the lens microcomputer 240 finds the current subject distance from these two pieces of information (the current rotational position of the zoom ring 84, and the position of the focus lens unit 275 with respect to the second lens group unit 277). At this point, the position of the focus lens unit 275 with respect to the second lens group unit 277 is corrected by the corrector 240c so that it is shifted by the correction amount Yc to the Z axis direction positive side. In finding the subject distance, the position information for the focus lens unit 275 after correction is used. The lens microcomputer 240 selects the tracking table 100 corresponding to the subject distance thus found. Here, we will assume that the tracking table 100 corresponding to infinity was selected.

Next, the lens microcomputer 240 again acquires the rotational position of the zoom ring 84, and finds the rotational speed of the zoom ring 84, that is, the rate of change in the focal distance, from the amount of change in the rotational position of the zoom ring 84.

Next, the lens microcomputer 240 predicts the rotational position of the zoom ring 84 after the elapse of a specific time from the current rotational angle of the zoom ring 84 and the rotational speed of the zoom ring 84, and finds as a target position the position of the focus lens unit 275 in the Z axis direction corresponding to the predicted rotational position of the zoom ring 84. The target position thus found is corrected by the corrector 240c so that it is shifted by the correction amount Yc to the Z axis direction positive side. The lens microcomputer 240 drives the focus motor 64 via the focus drive controller 41 so that the focus lens unit 275 will be located at this corrected target position after the elapse of a specific time. Consequently, the focus lens unit 275 is driven to follow the movement of the other lens groups, and the subject distance is kept constant, even when the adapter length of the adapter 120 is shorter than the reference length Xs0.

Thus, in the electronic tracking operation, the lens microcomputer 240 predicts the change in the focal distance that will accompany zooming operation, and acquires from the tracking table 100 the target position of the focus lens unit 275 corresponding to the predicted focal distance. Here, since the adapter 120 is used, which has an adapter length Xs that is shorter than the reference length Xs0, this target position is corrected by the corrector 240c. The focus motor 64 drives the focus lens unit 275 to the corrected target position in parallel with the zooming operation of the optical system L. Since this operation is executed at specific time intervals, even if the zoom ring 84 is rotated and the focal distance of the optical system L changes, the focus lens unit 275 will move to the Z axis direction position corresponding to the focal distance on the basis of the tracking table 100, and the drive of the focus lens unit 275 can keep up with the change in the focal distance. Consequently, the subject distance can be kept substantially constant regardless of any change in the focal distance. The control of these components may be performed by the body microcomputer 10, rather than lens microcomputer 240.

Similarly, when the focused subject distance is short, such as 1 m, for example, the tracking table 100 for which the subject distance is 1 m is selected, and both when the move is from the wide angle end to the telephoto end, and when the move is from the telephoto end to the wide angle end, the focused state at a short distance can be maintained by drive of the focus motor 64, and the zooming operation can be carried out smoothly.

In particular, since the focus lens unit 275 and the focus motor 64 move in the Z axis direction integrally with the second lens group unit 277, even if the user turns the zoom ring 84 quickly, the focus lens unit 275 can still be moved integrally with the second lens group unit 277. Therefore, if the subject distance is to be kept substantially constant before and after the zooming operation, the focus motor 64 may move the third lens group G3 by a distance obtained by subtracting the distance that the second lens group G2 is moved by the cam mechanism with respect to the imaging sensor 11 from the distance that the third lens group G3 is to be moved with respect to the imaging sensor 11. This makes it easy to keep up with fast operation of the zoom ring 84 by the user.

Also, in this embodiment, if a zooming operation is performed from the wide angle end to the telephoto end, with the subject distance at infinity, the focus lens unit 275 (more precisely, the third lens group G3, which is a focus lens group) must be moved in the Z axis direction by about 3 mm with respect to the imaging sensor 11. When the focus motor 64 is driven at 800 pps, the amount of drive of the focus lens unit 275 per rotation of the focus motor 64 is 0.6 mm as mentioned above, so it takes 0.25 second to move the focus lens unit 275 by 3 mm in the Z axis direction on the basis of the tracking table. Since it is possible to move the focus lens unit 275 from the wide angle end to the telephoto end in approximately 0.25 second, even if the user should turn the zoom ring 84 from the wide angle end to the telephoto end in 0.5 second, the drive of the focus lens unit 275 can keep up with the change in focal distance. Consequently, even if the user should perform a quick zooming operation while looking at the subject on the display unit 20 in live view mode, for example, the subject image that shows on the display unit 20 will be unlikely to be blurred, and this makes the camera easier to use.

(4) Focusing Operation

Next, the focusing operation of the digital camera 301 will be described. The digital camera 301 has two focus modes: an auto focus imaging mode and a manual focus imaging mode. The user of the digital camera 301 can select the focus mode with a focus imaging mode setting button (not shown) provided to the camera body 3.

In the auto focus imaging mode, auto focus operation is performed by contrast detection method. When auto focusing is performed by contrast detection method, the body microcomputer 10 asks the lens microcomputer 240 for contrast AF data. This contrast AF data is necessary in auto focusing by contrast detection method, and includes, for example, the focus drive speed, focus shift amount, image magnification ratio, and compatible AF method, and the information is memorized in the memory 240a as the above-mentioned lens information.

The body microcomputer 10 monitors whether or not the shutter button 30 has been pressed half way down. If the shutter button 30 has been pressed half way down, the body microcomputer 10 issues an auto focus commencement command to the lens microcomputer 240. This auto focus commencement command indicates that auto focusing by contrast detection method is to be started. Upon receiving this command, the lens microcomputer 240 drives and controls the focus motor 64, which is a focus actuator. More precisely, the lens microcomputer 240 sends a control signal to the focus drive controller 41. On the basis of this control signal, the focus drive controller 41 drives the focus motor 64, and the focus lens unit 275 moves minutely.

The body microcomputer 10 computes an evaluation value for auto focus operation (hereinafter referred to as an AF evaluation value) on the basis of the received image data. More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the in-screen high-frequency part of the brightness signal. The AF evaluation value thus computed is stored in a DRAM (not shown) in a state of being associated with the exposure synchronization signal. Since the lens position information acquired by the body microcomputer 10 from the lens microcomputer 240 is also associated with the exposure synchronization signal, the body microcomputer 10 can store the AF evaluation value with it associated with the lens position information. Since the adapter 120 is used, which has an adapter length Xs that is shorter than the reference length Xs0, the lens position information acquired by the body microcomputer 10 from the lens microcomputer 240 is corrected by the corrector 240c so that it is shifted by the correction amount Yc to the Z axis direction positive side, for example. This correction processing of the position information for the focus lens unit 275 may be performed by the body microcomputer 10.

Next, the body microcomputer 10 extracts as the focal point the position of the focus lens unit 275 at which the AF evaluation value is at its maximum, on the basis of the AF evaluation value stored in the DRAM. The method for driving the focus lens unit 275 in the extraction of the focal point is generally known as a hill climbing method. With a hill climbing method, the focus lens unit 275 is moved in the direction of increasing the AF evaluation value, and the AF evaluation value is found for each position of the focus lens unit 275. This operation is continued until the maximum value for the AF evaluation value is detected, that is, until the AF evaluation value increases up to its peak and then begins to decrease.

The body microcomputer 10 sends a control signal to the focus drive controller 41 via the lens microcomputer 240 so that the focus lens unit 275 will be driven to the position corresponding to the extracted focal point. The focus drive controller 41 produces a drive pulse for driving the focus motor 64 on the basis of a control signal from the body microcomputer 10 (or the lens microcomputer 240), for example. The focus motor 64 is driven by an amount corresponding to this drive signal, and the focus lens unit 275 moves in the Z axis direction to the position corresponding to the focal point.

Focusing in auto focus imaging mode is performed in this way with the digital camera 301. The above operation is executed instantly when the user presses the shutter button 30 half way down.

Focusing by contrast detection method can also be carried out in monitor imaging mode (known as live view mode), in which real-time image data can be produced with the imaging sensor 11. The reason for this is that in live view mode, image data is produced in a steady state by the imaging sensor 11, and auto focusing by contrast detection method using this image data is easy.

In viewfinder mode, since a real-time image of the subject is displayed on the display unit 20, the user can decide on the composition for taking the still picture or moving picture while looking at the display unit 20. Also, there is another imaging mode the user can select in addition to live view mode using the display unit 20, which is a second live view mode (viewfinder imaging mode) in which the subject image from the interchangeable lens unit 2 is guided to the liquid crystal viewfinder 8 (viewfinder unit 38).

The manual focus imaging mode will now be described.

When the user turns the focus ring 89, the focus ring angle detector 90 detects the rotational angle of the focus ring 89 and outputs a signal corresponding to this rotational angle. The focus drive controller 41 is able to receive rotational angle signals from the focus ring angle detector 90 via the lens microcomputer 240, and produces a drive signal for the focus motor 64 on the basis of these rotational angle signals. At this point the target position of the focus lens unit 275 is corrected by the corrector 240c, for example. More specifically, the target position is corrected by the corrector 240c so that it is shifted by the correction amount Yc to the Z axis direction positive side. A drive signal corresponding to the corrected target position is produced by the focus drive controller 41. The lead screw 64a of the focus motor 64 rotates according to this drive signal. When the lead screw 64a of the focus motor 64 rotates, the focus lens unit 275 moves in the Z axis direction via the rack 66 that meshes with the lead screw 64a. In the wide angle end state shown in FIGS. 5 and 6, the subject distance is infinity, but as the subject distance decreases, the focus lens unit 275 moves to the Z axis direction positive side. Similarly, in the telephoto end state shown in FIGS. 7 and 8, the subject distance is infinity, but as the subject distance decreases, the focus lens unit 275 moves to the Z axis direction positive side. The amount of movement of the focus lens unit 275 is greater in this case than in the case of the wide angle end.

In this way, the user can perform focusing by turning the focus ring 89 while looking at the subject on the display unit 20. In the manual focus imaging mode, when the user presses the shutter button 30 all the way down, imaging is performed in this unchanged state.

(5) Still Picture Imaging

When the user presses the shutter button 30 all the way down, a command is sent from the body microcomputer 10 to the lens microcomputer 240 so that the aperture value of the optical system L will be set to the aperture value computed on the basis of the light measurement output of the imaging sensor 11. The aperture drive controller 42 is controlled by the lens microcomputer 240, and the aperture unit 62 is stopped down to the indicated aperture value. Simultaneously with the indication of the aperture value, a drive command is sent from the imaging sensor drive controller 12 to the imaging sensor 11, and a shutter unit 33 drive command is sent out. The imaging sensor 11 is exposed by the shutter unit 33 for a length of time corresponding to the shutter speed computed on the basis of the light measurement output of the imaging sensor 11.

The body microcomputer 10 executes imaging processing and, when the imaging is completed, sends a control signal to the image recording controller 19. The image recorder 18 records an image signal to an internal memory and/or removable memory on the basis of the command of the image recording controller 19. The image recorder 18 records imaging mode information (whether auto focus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the display unit 20.

Also, upon completion of the exposure, the shutter unit 33 is reset to its initial position by the body microcomputer 10. The body microcomputer 10 issues a command to the lens microcomputer 240 for the aperture drive controller 42 to reset the aperture unit 62 to its open position, and a reset command is sent from the lens microcomputer 240 to the various units. Upon completion of this resetting, the lens microcomputer 240 notifies the body microcomputer 10 that resetting is complete. After the resetting completion information has been received from the lens microcomputer 240, and after a series of post-exposure processing has been completed, the body microcomputer 10 confirms that the shutter button 30 is not being pressed, and the imaging sequence is concluded.

(6) Moving Picture Capture

The digital camera 301 also has the function of capturing moving pictures. In moving picture imaging mode, image data is produced by the imaging sensor 11 at a specific period, and the image data thus produced is utilized to continuously carry out auto focusing by contrast detection method. In moving picture imaging mode, if the shutter button 30 is pressed, or if the moving picture imaging button 24 is pressed, a moving picture is recorded by the image recorder 18, and when the shutter button 30 or the moving picture imaging button 24 is pressed again, recording of the moving picture by the image recorder 18 is stopped.

Features of Camera Body

The features of the camera body 3 described above are as follows.

(1)

With this camera body 3, since the flange back Xa is shorter than the lens back Xb of the interchangeable lens unit 202, the size can be reduced compared to a camera body that conforms to the same standard as the interchangeable lens unit 202.

Furthermore, the flange back Xa is shorter than the length obtained by subtracting the adapter length Xs from the lens back Xb. In other words, the adapter length Xs is shorter than the reference length Xs obtained by subtracting the flange back Xa from the lens back Xb. Accordingly, when the interchangeable lens unit 202 is mounted to the camera body 3 via the adapter 120, the position of the interchangeable lens unit 202 is shifted to be closer to the camera body 3 in the optical axis direction. Consequently, the margin range H can be ensured on the camera body 3 side (in this embodiment, the infinity side) of the movement range M1 of the focus lens unit 275. That is, even an interchangeable lens unit having no margin range H can be made to be compatible with contrast detection.

Because of the above, with this camera body 3 the size can be reduced while ensuring compatibility with more interchangeable lens units.

(2)

With this camera body 3, the correction determination section 10b of the body microcomputer 10 can determine whether or not to perform correction processing on lens operation information related to the operation of the focus lens on the basis of the flange back Xa, the lens back Xb, and the adapter length Xs. Accordingly, compatibility can be ensured even when the interchangeable lens unit 202, which conforms to a different standard, is mounted to the camera body 3 via the adapter 120.

As discussed above, the lens operation information referred to here may be, for example, information about the position of the focus lens unit 275 in the Z axis direction (the optical axis AZ direction) with respect to the second lens group unit 277, information about the position of the focus lens unit 275 with respect to the imaging sensor 11, and the movable range of the focus lens unit 275 in the Z axis direction (more precisely, the limit position).

(3)

With this camera body 3, since the determination value V is computed from the flange back Xa, the lens back Xb, and the adapter length Xs, it is easier to determine whether or not to subject the lens operation information to correction processing.

(4)

With this camera body 3, the correction command section 10d of the body microcomputer 10 sends a position correction command to the corrector 240c of the lens microcomputer 240 on the basis of the determination result of the correction determination section 10b. Since the corrector 240c performs correction processing on information about the position of the focus lens unit 275 on the basis of this position correction command, the information about the position of the focus lens unit 275 can be corrected so that the position of the focus lens unit 275 in the optical axis direction is not shifted from the position set forth in the optical design. Consequently, with this camera body 3, an interchangeable lens unit with a different standard can be employed, thus ensuring compatibility with more interchangeable lens units.

Also, since the determination value V is sent along with the position correction command from the body microcomputer 10 to the lens microcomputer 240, the lens microcomputer 240 can easily recognize the correction amount.

(5)

Also, the correction command section 10d sends a limit correction command to the corrector 240c of the lens microcomputer 240 on the basis of the determination result of the correction determination section 10b so that correction processing will be performed on the movement range M1 or movement range M2 of the focus lens unit 275. The corrector 240c performs correction processing on the movement range M1 or movement range M2 of the focus lens unit 275 on the basis of this limit correction command. This keeps the focus lens unit 275 from moving in a range (M19 or M29) that is outside the range set forth by optical design. Also, the margin range H1 or H2 used for contrast AF can be kept at the proper distance, and a decrease in the contrast AF speed can be prevented.

Also, since the determination value V is sent along with the limit correction command from the body microcomputer 10 to the lens microcomputer 240, the lens microcomputer 240 can easily recognize the correction amount.

Features of Adapter

The features of the adapter 120 are as follows.

(1)

With this adapter 120, the adapter length Xs is shorter than the reference length Xs0 obtained by subtracting the flange back Xa from the lens back Xb. Accordingly, when the interchangeable lens unit 202 is mounted to the camera body 3 via the adapter 120, the position of the interchangeable lens unit 202 is shifted closer to the camera body 3 in the optical axis direction. Consequently, the margin range H can be ensured on the camera body 3 side (in this embodiment, the infinity side) of the movement range M1 of the focus lens unit 275. That is, even an interchangeable lens unit having no margin range H can be made to be compatible with contrast detection.

Because of the above, with this adapter 120 the size can be reduced while ensuring compatibility between the camera body and the interchangeable lens unit.

(2)

With this adapter 120, since the adapter length Xs is pre-stored in the adapter microcomputer 123, the adapter length Xs can be used in determining whether or not the lens operation information needs to undergo correction processing, so the need for correction processing can be accurately determined.

Also, since the adapter length Xs is pre-stored in the adapter microcomputer 123, the determination value V can be easily computed, and the correction amount can be easily ascertained.

Other Embodiments

Embodiments of the present invention are not limited to those discussed above, and various changes and modifications are possible without departing from the gist of the present invention. Also, the above embodiments are basically just preferred examples, and are not intended to limit the present invention, its applications, or the scope of these applications.

(1)

In the above embodiments, the digital camera was capable of capturing both moving and still pictures, but may instead be capable of capturing just still pictures, or just moving pictures.

(2)

The above-mentioned digital camera 1 did not have a quick return mirror, but a quick return mirror may be installed as in conventional single reflex lens cameras.

Also, the camera body 3 is compatible with only a contrast detection method, but it may be compatible with a phase difference detection method in addition to a contrast detection method.

(3)

The configuration of the optical system L is not limited to that in the above embodiments. For example, the third lens group G3 may be constituted by a plurality of lenses, and the second lens group G2 may be constituted by a single lens.

(4)

In the above embodiments, the exposure time to the imaging sensor 11 was controlled by operating the shutter unit 33, but the exposure time of the imaging sensor 11 may instead be controlled by an electronic shutter.

(5)

In the above embodiments, electronic tracking was performed by the lens microcomputer 40, but a command may be sent from the body microcomputer 10 to the lens microcomputer 40, and the control of the electronic tracking performed on the basis of this command.

(6)

The embodiments disclosed herein are given as separate embodiments, but the constitutions of these embodiments may also be combined.

(7)

In the above embodiments, Xs=Xs0−Xc, but the same effect as that of the camera body 3 can be obtained as long as the following formula (6) is satisfied.

[Mathematical Formula 6]

$$Xs \leq Xb - Xa - Xc = Xs0 - Xc \tag{6}$$

(8)

The interchangeable lens unit 202 was not compatible with a contrast detection method, but an interchangeable lens unit that is compatible with contrast detection can be mounted to the camera body 3.

(9)

In the above embodiments, the corrector 240c of the lens microcomputer 240 corrected the lens operation information, but the body microcomputer 10 of the camera body 3 may instead correct the lens operation information.

For example, in the above embodiments, the correction amount Yc was computed by the lens microcomputer 240 on the basis of Formula 4, but the body microcomputer 10 may have a function of computing the correction amount Yc. In this case, either the correction coefficients K for a variety of interchangeable lens units are stored in the body microcomputer 10 ahead of time, or correction coefficients K are acquired from the lens microcomputer 240. The body microcomputer 10 computes the correction amount Yc on the basis of Formula 4 using the distance Xc and the correction coefficient K.

Furthermore, the body microcomputer 10 may be designed to correct information about the position of the focus lens unit 275 by using the correction amount Yc according to the standard of that interchangeable lens unit if the standard of the mounted interchangeable lens unit does not match the standard of the camera body 3. One possible scenario in which correction processing is executed is when information about the position of the focus lens unit 275 is exchanged with the lens microcomputer 240.

More specifically, when information about the position of the 275 is received from the lens microcomputer 240, the body microcomputer 10 corrects the received position information so that the position of the focus lens unit 275 indicated by the position information is shifted by the correction amount Yc to the Z axis direction positive side, for example. This correction processing could also be called processing in which the received position information is converted into corrected position information used by the body microcomputer 10.

Also, when position information about the focus lens unit 275 is sent to the lens microcomputer 240, the body microcomputer 10 corrects the sent position information so that the position of the focus lens unit 275 indicated by the position information is shifted by the correction amount Yc to the Z axis direction negative side, for example. This correction processing could also be called processing in which the corrected position information used by the body microcomputer 10 is converted into the original position information used by the lens microcomputer 240.

With the body microcomputer 10 described herein, the position information for a focus lens corresponding to a given subject distance is made to be different when the standard of the interchangeable lens unit matches the standard of the camera body 3, and when the standard of the interchangeable lens unit does not match the standard of the camera body. For example, when the above-mentioned correction processing is performed, the position information for a focus lens corresponding to infinity used by the camera body 3 is different when the standard of the interchangeable lens unit matches the standard of the camera body 3 from that when the standard of the interchangeable lens unit does not match the standard of the camera body. In other words, the camera body 3 will be equipped with the above-mentioned corrector as long as the camera body 3 has a function of varying the position information for the focus lens according to the standard of the interchangeable lens unit.

Furthermore, even if the body microcomputer 10 does not originally have the above-mentioned correction function, it is conceivable that a correction function will be added to the body microcomputer 10 through a firmware update.

(10)

In the above embodiments, the adapter length Xs was stored in the adapter microcomputer 123 as information related to the adapter length, but information related to lens back may be stored in addition to the adapter length Xs. Information related to lens back includes, for example, the lens back and lens ID of the interchangeable lens units that can be mounted to the adapter 120 (an example of information related to the interchangeable lens unit). In this case, the lens back and lens ID are stored in the adapter microcomputer 123 so that they are associated. A plurality of lens back values may also be stored in the adapter microcomputer 123 along with lens ID.

For example, in the case of the interchangeable lens unit 202, the lens back Xb and the lens ID of the interchangeable lens unit 202 are stored in the adapter microcomputer 123. When an interchangeable lens unit is mounted to the camera body 3 via the adapter 120, the lens back Xb and the lens ID stored in the adapter microcomputer 123 are sent to the body microcomputer 10 of the camera body 3.

The body microcomputer 10 selects data corresponding to the lens ID for the interchangeable lens unit 202 from among the lens back value and lens ID taken from the adapter 120. The selected data is used for correction processing or determination processing about the need for correction. By thus pre-storing information related to the adapter length in the adapter microcomputer 123 of the adapter 120, correction processing or determination processing about the need for correction can be performed even if no information related to lens back has been stored in the lens microcomputer 240 of the interchangeable lens unit 202.

Also, the determination value V may be stored in the adapter microcomputer 123. The determination value V, as discussed above, can be computed using Formula 5 from the lens back Xb of the interchangeable lens unit 202, the flange back Xa of the camera body 3, and the adapter length Xs. The camera ID of the camera body and the lens ID of the interchangeable lens unit corresponding to this determination value V are stored in the adapter microcomputer 123 in association with the determination value V. When an interchangeable lens unit is mounted to the camera body 3 via the adapter 120, the camera ID, lens ID, and determination value V stored in the adapter microcomputer 123 are sent to the body microcomputer 10.

The body microcomputer 10 selects data corresponding to the camera ID for the camera body 3 and the lens ID for the interchangeable lens unit 202 from among the camera ID, lens ID, and determination value V taken from the adapter 120. The selected data is used for correction processing or determination processing about the need for correction. By thus pre-storing the determination value V in adapter microcomputer 123 of the adapter 120, correction processing or determination processing about the need for correction can be performed even if no information related to lens back has been stored in the lens microcomputer 240 of the interchangeable lens unit 202.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A mirrorless camera body to which an interchangeable lens unit can be mounted via an adapter, the interchangeable lens unit including a focus lens, the camera body comprising:
 a housing;
 an imaging element provided in the housing and configured to acquire an image signal of a subject;
 a body mount fixed to the housing and having a portion to which the adapter can be mounted, the body mount being disposed at a position away from the light receiving face of the imaging element by an amount of a flange back, the amount of flange back is a predetermined distance which remains constant,
 a correction determination section configured to determine whether or not to perform correction processing on lens operation information related to the operation of the interchangeable lens unit, on the basis of the flange back, a lens back and an adapter length, when the interchangeable lens unit having the lens back is mounted, and
 a corrector configured to perform correction processing on the lens operation information when the correction determination section determines to perform correction processing on the lens operation information, wherein:
 the lens back of the interchangeable lens unit being longer than the flange back,
 the flange back being shorter than a length obtained by subtracting the adapter length, which is a length of the adapter in the optical axis direction, from the lens back,
 a focal position is changed between a forward side of the imaging element and a backward side of the imaging element by moving the focus lens in an optical axis direction to set a focal position on the imaging element;

the focal position for focusing at infinity is set on the imaging element by the focus lens passing an infinity end in the optical axis direction, the lens operation information includes position information about a focus lens of the interchangeable lens unit, and the corrector is configured to convert the position information into correction position information by using a correction coefficient that is a ratio of an amount of movement of a rear focal position of the interchangeable lens unit versus an amount of movement of the focus lens.

2. The camera body according to claim 1, wherein the correction determination section is configured to compute a determination value for determining whether or not to perform correction processing on the lens operation information from the flange back, the lens back and the adapter length.

3. The camera body according to claim 1, wherein the corrector uses the correction coefficient to convert the position information into the correction position information when the position information is acquired from the interchangeable lens unit.

4. The camera body according to claim 1, wherein the corrector is configured to use the correction coefficient to convert the correction position information into the position information.

5. The camera body according to claim 4, wherein the corrector uses the correction coefficient to convert the correction position information into the position information when the position information is sent to the interchangeable lens unit.

6. The camera body according to claim 1, wherein the corrector is configured to acquire the correction coefficient from the interchangeable lens unit.

7. The camera body according to claim 1, wherein the corrector is configured to compute a correction amount for converting the position information into the correction position information on the basis of the correction coefficient, the flange back, the lens back and the adapter length.

8. The camera body according to claim 1, wherein the lens operation information includes information related to an operation of the focus lens of the interchangeable lens unit.

9. The camera body according to claim 1, wherein the lens operation information includes information related to a movable range of the focus lens of the interchangeable lens unit.

10. An imaging device, comprising:
the camera body according to claim 1; and
the adapter having the adapter length.

11. The camera body according to claim 1, further comprising:
a stopper configured to define a position of the focus lens closest to the imaging element and disposed between the infinity end and the imaging element, wherein the focus lens passes the infinity end toward the stopper.

12. The camera body according to claim 1, wherein the focal position is set on the imaging element by contrast Auto-Focus (AF).

\* \* \* \* \*